(12) United States Patent
Mander et al.

(10) Patent No.: US 6,243,724 B1
(45) Date of Patent: *Jun. 5, 2001

(54) METHOD AND APPARATUS FOR ORGANIZING INFORMATION IN A COMPUTER SYSTEM

(75) Inventors: Richard Mander, Palo Alto; Daniel E. Rose, San Jose; Gitta Salomon, Palo Alto; Yin Yin Wong, Menlo Park; Timothy Oren, Sunnyvale; Susan Booker, San Carlos, all of CA (US); Stephanie Houde, Cambridge, MA (US)

(73) Assignee: Apple Computer, Inc., Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/287,108

(22) Filed: Aug. 8, 1994

Related U.S. Application Data

(63) Continuation of application No. 07/876,921, filed on Apr. 30, 1992, now abandoned.

(51) Int. Cl.⁷ .................................................. G06F 17/21
(52) U.S. Cl. ......................... 707/526; 345/334; 345/348
(58) Field of Search .................................. 395/144, 145, 395/146, 155, 159, 161; 345/115, 116, 121, 326, 334, 348, 349, 350, 357; 364/419.19; 707/526, 527, 528, 529

(56) References Cited

U.S. PATENT DOCUMENTS

| | | | |
|---|---|---|---|
| 4,885,704 | 12/1989 | Takagi et al. | 395/159 |
| 4,945,475 | 7/1990 | Bruffey et al. | 364/200 |
| 5,021,976 * | 6/1991 | Wexelblat et al. | 364/188 |

(List continued on next page.)

FOREIGN PATENT DOCUMENTS 3714172   4/1987   (DE) .

OTHER PUBLICATIONS

Borland, Quattro Pro User's Guide, 1989, p. 229, 235–236, 251–255, 275–286.*

(List continued on next page.)

*Primary Examiner*—Joseph H. Feild
(74) *Attorney, Agent, or Firm*—Blakely, Sokoloff, Taylor & Zafman

(57) ABSTRACT

A method and apparatus for organizing information in a computer filing system. The method and apparatus include the creation of a pile comprising a collection of documents and displaying a graphical representation of the collection of documents. The method and apparatus further include browsing the collection of documents by pointing a cursor at a particular item in the collection of documents to reveal an indicia for the particular item in the collection of documents. The filing system can automatically divide a pile (e.g. a collection of documents from an electronic mail network) into subpiles on the basis of the content of each document in the pile, and the filing system, at the user's request can automatically file away documents into existing piles in the computer system on the basis of a similarity match between the content (or other internal representation) of the document and the content (or other internal representation) of existing piles in the computer system. The filing system can also create a pile from a sample document by using the internal representation of the document as the internal representation of the new pile. The computer filing system provides various interfaces in connection with piles to the user of the system to provide feedback and other information to the user, including information concerning the documents and piles in the computer's filing system.

8 Claims, 28 Drawing Sheets

U.S. PATENT DOCUMENTS

| | | | |
|---|---|---|---|
| 5,060,135 | * | 10/1991 | Levine et al. .............. 364/DIG. 1 X |
| 5,140,677 | | 8/1992 | Fleming et al. ..................... 395/159 |
| 5,202,828 | * | 4/1993 | Vertelney et al. ............... 395/159 X |
| 5,241,671 | * | 8/1993 | Reed et al. ........................... 395/600 |
| 5,247,437 | * | 9/1993 | Vale et al. ....................... 364/419.19 |
| 5,287,448 | * | 2/1994 | Nicol et al. .......................... 395/159 |
| 5,297,249 | * | 3/1994 | Bernstein et al. ................... 395/156 |
| 5,305,435 | * | 4/1994 | Bronson ................................ 395/159 |
| 5,341,293 | * | 8/1994 | Vertelney et al. ............... 395/159 X |
| 5,347,628 | * | 9/1994 | Brewer et al. ....................... 395/159 |
| 5,349,658 | * | 9/1994 | O'Rourke et al. ............... 395/159 X |
| 5,353,391 | * | 10/1994 | Cohen et al. .................... 395/161 X |
| 5,442,778 | | 8/1995 | Pedersen et al. .................... 395/600 |
| 5,442,795 | | 8/1995 | Levine et al. ........................ 395/800 |

OTHER PUBLICATIONS

Malone, T.W., How Do People Organize Their Desks? Implications for the Design of Office Information Systems, ACM Transactions on Office Information System, vol. 1, No. 1, Jan. 1983, pp. 99–112.

Miller P. Terelbaum S., and Webb, K. BUSINESS an end–user oriented application development language, SIGMOD Record. 12, 1, (Oct. 1981), pp. 38–69.

"Term–Weighting in Automatic Text Retrieval", Information Processing & Management vol. 24, No. 5, pp. 513–523, 1988.

* cited by examiner

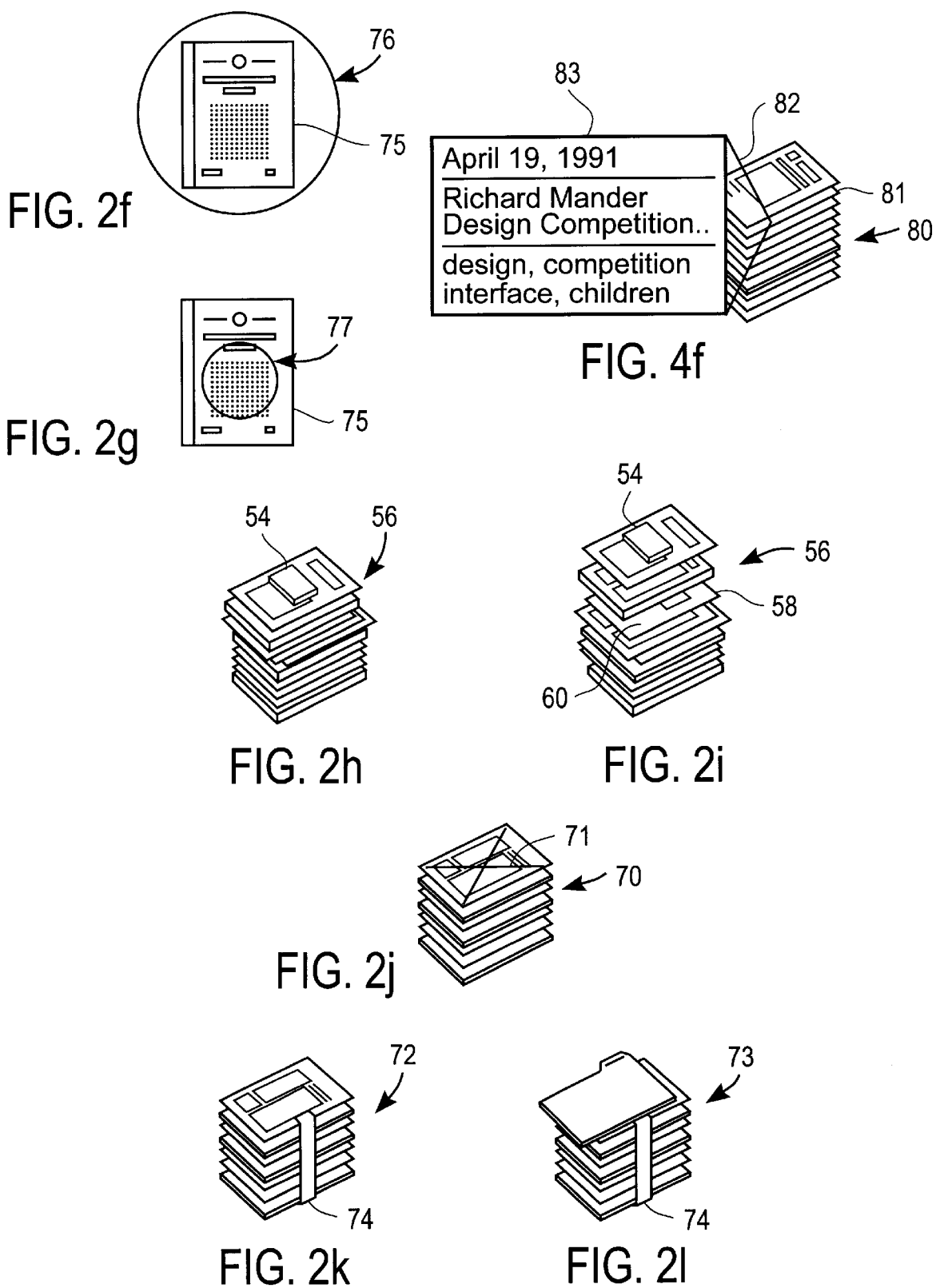

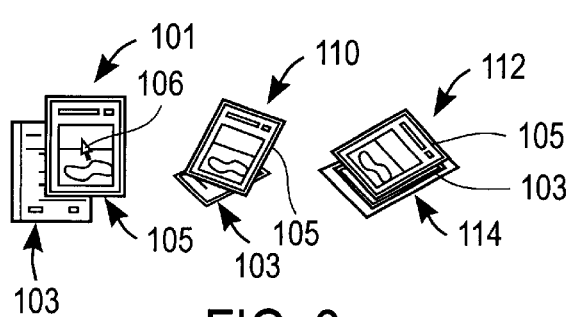
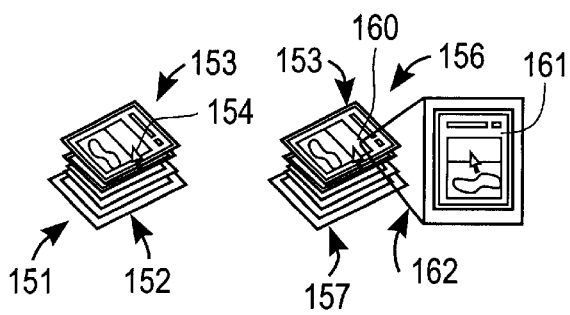
FIG. 3  FIG. 4a
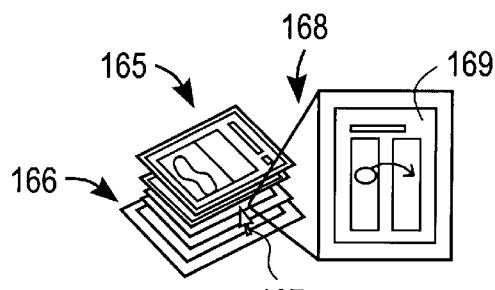
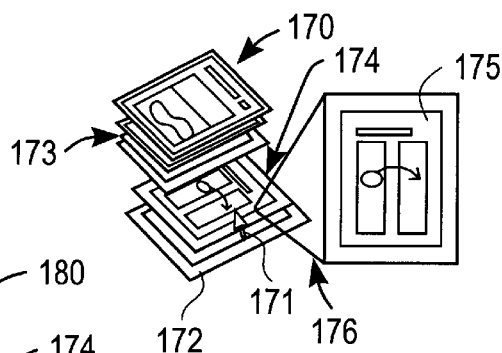
FIG. 4b  FIG. 4c
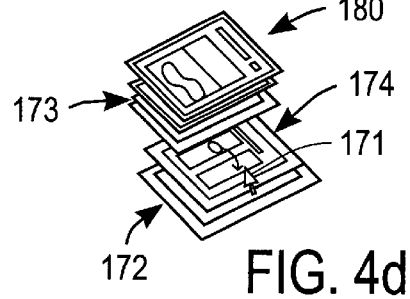
FIG. 4d
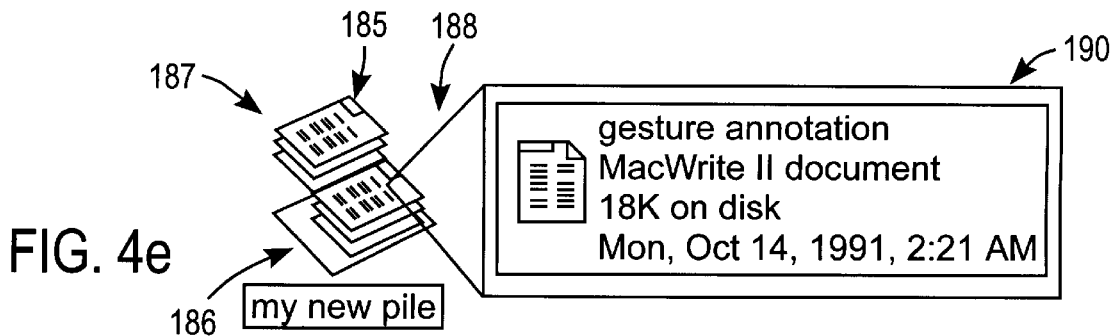
FIG. 4e
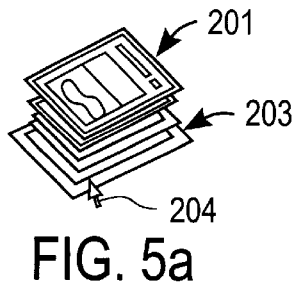
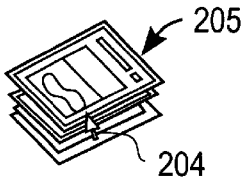
FIG. 5a  FIG. 5b pg7/10 ~125

It occurs to me that it would be a worthwhile exercise to crystallize our vision of One way to do this is to put together a video script (whether or not any video is ever made).

What are the (two or three?) important ideas? Why will a be more interesting than anything else that will be around in a couple of years? What are the illustrative uses for why is tres cool)?

☐ Find: Blackstone  (start) ~127

Who is the audience fo for us, to clarify what is important are interesting, the actual video, if any, could be for internal advertising (i.e., for other groups that we hope will do things for us and with us and for executive staff to keep resources coming); it could also be for external consumption to create demand for and interest in the kind of stuff we're doing.

~126

What do I want from you? Anything you have on the questions above.

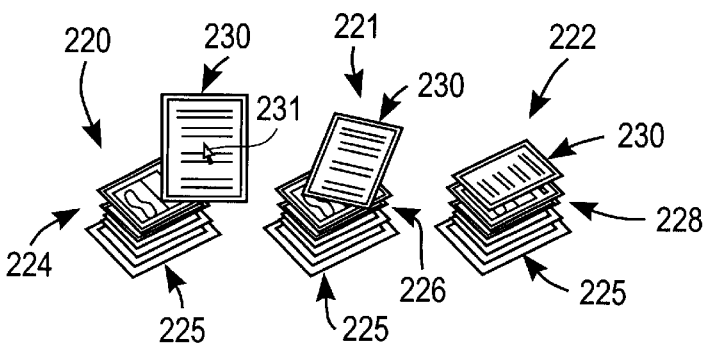
FIG. 6
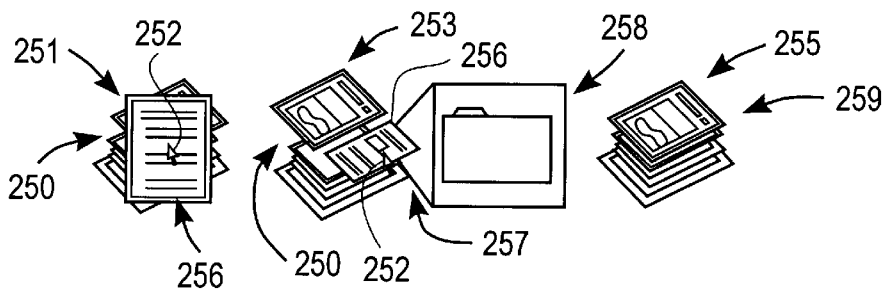
FIG. 7
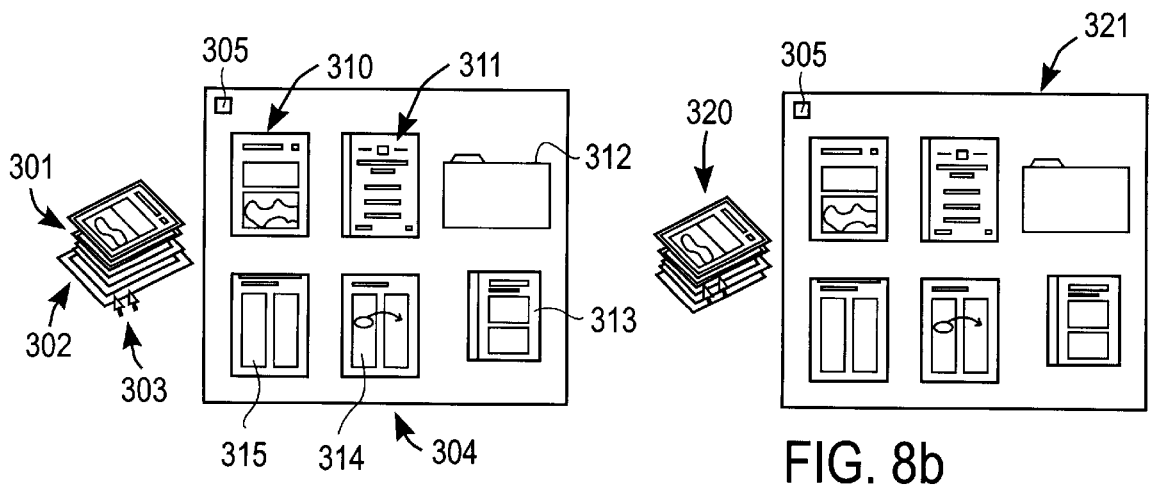
FIG. 8a
FIG. 8b
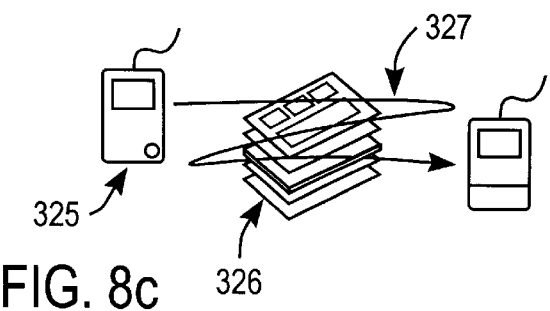
FIG. 8c
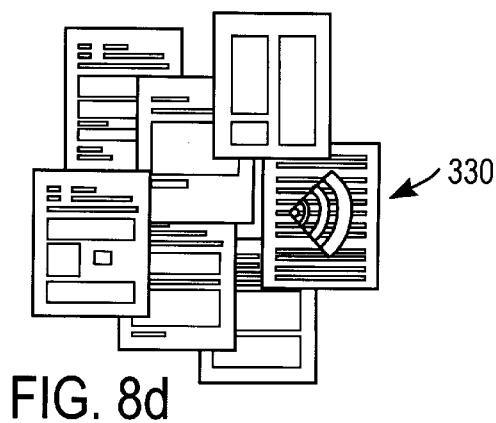
FIG. 8d

METHOD AND APPARATUS FOR ORGANIZING INFORMATION IN A COMPUTER SYSTEM

This is a continuation of application Ser. No. 07/876,921, filed Apr. 30, 1992 now abandoned.

BACKGROUND OF THE INVENTION

1. Field of the Invention

The present invention relates to the field of computer systems and more particularly to user interfaces for computer systems and to methods and apparatuses for implementing user interfaces for organizing information in a computer system.

2. Prior Art

Prior art computer systems for organizing information typically fall into two types of filing systems. These filing systems are often implemented as part of the operating system of the computer system and are therefore provided as a basic utility to the user of the system to allow the user to organize information in a manner desired by the user. The two types of systems referred to above are the flat file system and the hierarchical file system.

In the flat file system, the computer stores all files (e.g. documents) at one level of hierarchy such that the user when examining these files sees all files at this level. In other words, the system does not discriminate between files which the user may have put in a folder or a subdirectory and files which are not in folders or subdirectories. This type of flat filing system is similar to a desk where all documents on the desk are spread out with none in any folders or other containers. Clearly, such a filing system becomes cumbersome when the number of documents becomes large. For example, if the user is searching for a particular document on the system, the user may have to search through a long list of documents in order to find the desired document.

Hierarchical filing systems on computers attempt to improve filing systems by providing a hierarchy of folders or subdirectories into which the user may store information, such as text documents. Examples of hierarchical filing systems are well known in the prior art, including a hierarchical filing system disclosed in U.S. Pat. No. 4,945,475. In these hierarchical filing systems, the user will file a document into a folder which may itself be within another folder. Looking for any documents within a first folder will require opening the first folder after opening the second folder which contains the first folder. In this manner, the user is not presented with a bewildering number of documents as in the flat filing system and the user's files are maintained in an orderly and systematic way within the hierarchy specified by the user. An example of this hierarchical filing is shown in FIG. 2 of the U.S. Pat. No. 4,945,475 wherein documents 21 and 22 are within folder 20 which itself is within folder 18 which is also stored in another folder, folder 17. Thus, in order to view documents 21 and 22 the user must direct the computer system to examine the contents of the subdirectory represented by folder 20 by specifying the full address of folder 20 (in the case of a non-graphical user interface) or by opening the series of folders necessary to obtain a view of the folder containing the desired documents (in the case of a graphical user interface). Current versions of the Finder on the Macintosh computer systems from Apple Computer are examples of hierarchical filing systems with graphical user interfaces, and other such filing systems with graphical user interfaces are well known.

While these hierarchical filing systems allow the user to specify a structure within which to file (and hence store) information in order to avoid the clutter of a flat filing system, the hierarchical structure forces the computer user to be as organized as possible in filing information. If the user, as is often the case, has difficulty in filing documents because of the difficulty in deciding the proper categories of the document (e.g. the document does not clearly apply to any current category of filing where the category is implemented by having a folder or subdirectory for the category) then the user is typically most comfortable allowing the document to appear in the upper most directory of the hierarchy. As more and more documents which are stored in the computer system memory are left in the highest directory due to the difficulty in filing those documents, the user begins to have a bewildering clutter of documents in that highest directory, which then makes the system act as if it were a flat filing system (at least to the extent of the highest directory or to some other directory/subdirectory where the user is placing documents which are difficult to file away). It should be also noted that the difficulty in filing documents in a computer system also affects the way the user interacts with the computer in that the user attempts to avoid the difficult work involved in filing a document which is hard to categorize. This leads to procrastination or avoidance of the task. This tends to result in the computer becoming cluttered with documents which are hard to categorize or otherwise file or the user does not attempt to place the documents on the computer system at all because of the realization that they will be difficult to organize. This effect tends to negate the advantages of a filing system having a graphical user interface, and particularly a hierarchical filing system with a graphical user interface.

The problems discussed above are particularly troublesome in the case of mail documents (e.g. electronic mail documents) which have not been read by the user or have only been glanced at. By their nature, these documents are most difficult to categorize and file away because the user is not fully familiar with these documents. It will be appreciated that the computer user is responsible for appropriately filing all items; the system offers little assistance in this often tedious task.

The prior art has not provided solutions to deal with these problems. For example, Malone has studied the way people work in their physical offices and has noted the significance of piles of documents in these physical offices, and has discussed the implications for the design of electronic office information systems which might use conventional office management tools, such as piles, in a computer based information system. See, Malone, T. W., How do people organize their desks? Implications for the design of office information systems, ACM Transactions on Office Information Systems, Volume 1, Number 1, January 1983, Pages 99–112. Malone however does not describe how such a computer system would be implemented nor the graphical user interface involved in dealing with such piles or browsing such piles and other activities relating to these piles.

The present invention provides an improved filing system with a graphical user interface which allows users to organize information into piles or collections of documents and assists the user in organizing these collections of documents.

SUMMARY OF THE INVENTION

The invention provides a method and apparatus for organizing information in a computer system, particularly one having a graphical user interface which includes graphical representations of documents. The apparatus of the invention displays graphical representations of a plurality of documents each of which may be manipulated by the user by positioning a system cursor over one of the graphical representations (e.g. Icon) and signalling to the computer to select the document for some operation specified by the user. In the method of the invention, the user creates a pile (or collection of documents) by positioning the cursor (for example, a pointer) over one graphical representation of a document and then selecting that document and moving the graphical representation of the document (by moving the cursor) over to another graphical representation of another document and then depositing the first document on top of the second document in order to create a pile. The system will typically display a graphical representation of the pile which is different than the graphical representation of each document separately and after a pile is created, the original graphical representation of each document in the collection will typically no longer be displayed. A side-ways view of the graphical representation of the document replaces the original graphical representation of the document, and the side-ways view of the graphical representation is located in the graphical representation of the collection. The user may then browse through the pile by positioning the cursor at an item in the pile for a predetermined period of time to reveal a proxy within a viewing cone for the item positioned under the cursor. After the user creates a pile, the system may display a base (or plinth) under the pile to further indicate to the user that the collection of documents is a pile and to allow the user to select the pile as a group. The user may then select the pile for further action by pointing the cursor to the base of the pile.

The apparatus of the invention includes a processing means, such a microprocessor which is coupled to a cursor controlling device, such as a mouse and is coupled to a display means such as a video display screen and is also coupled to memory (e.g. RAM or a hard disk) for storing documents maintained in the filing system of the computer. The cursor control device, such as a mouse, typically includes a means for controlling the position of the cursor on the display screen and also includes a signal generation means, such as a switch which is mechanically coupled to a button which is depressed by the user to signal to the computer to make a selection of an item which is positioned under the cursor.

The system and method of the invention provide the user with various ways to organize piles and to manipulate piles stored in the filing system of the computer. For example, the filing system may be used to automatically file new documents into the appropriate pile according to criteria specified by the user or according to the internal contents of the document relative to the contents of a particular pile. The invention also provides a way for the user to visualize the contents of a pile according to various criteria (e.g. date), such as using visual cues such as color. The appearance of the graphical representation of the pile (e.g. dynamic or static icon of the pile) provides further information to the user, including the texture, thickness, and color of the various documents within the pile. Moreover, the user may specify to the system that it is the users preference to have system created piles look neat and user created piles look disheveled. The system may also, at the users request, create subpiles from an original pile (or any set of selected documents such as documents within a folder) according to criteria specified by the user or determined or suggested by the system.

Another aspect of the present invention is an apparatus and method for providing an internal representation of the contents of a pile, which representation is used as a criteria for organizing documents and folders within the pile. This internal representation is also used when the system automatically files documents at the user's request or automatically when a new or modified document appears in the filing system of the computer. The internal representation may also be used when the system creates subpiles from an original pile or when searching for documents in the filing system and for other operations relating to the present invention. In the preferred embodiment of the present invention, each document is provided with a vector which is representative of the words contained in the document and each pile includes a representation, such as a vector, which embodies the collective contents of the pile. The vector between a document and a pile may be compared for the purpose of determining the relatedness/similarity of the document to the pile for purposes of filing or other operations described as part of this invention.

BRIEF DESCRIPTION OF THE DRAWINGS

FIGS. 2a, 2b, 2c, 2d, 2e, 2f, 2g, 2h, 2i, 2j, 2k and 2l show various embodiments and representations of piles according the present invention.

FIG. 3 shows, in temporal fashion, an embodiment of the operation of creating a new pile.

FIGS. 4a, 4b, 4c, 4d, 4e and 4f show various embodiments of the operation of browsing a pile.

FIGS. 4g, 4h, 4i, 4j, 4k, 4l and 4m show stages overtime of an embodiment of browsing a pile.

FIGS. 5a and 5b show two embodiments relating to moving a pile as a unit.

FIG. 6 shows, in temporal fashion, the operation of adding an item to the top of a pile.

FIG. 7 shows, in temporal fashion, the operation of adding an item to the middle of a pile.

FIGS. 8a and 8b show, in temporal fashion, the operation of obtaining an alternate view for two different embodiments of the invention.

FIGS. 8c and 8d show another embodiment for obtaining an alternate view of a pile according to the present invention.

DETAILED DESCRIPTION OF THE INVENTION

A portion of the disclosure of this patent document contains material which is subject to copyright protection and to which a claim of copyright protection is made. The copyright owner has no objection to the facsimile reproduction by anyone of the patent disclosure, as it appears in the Patent and Trademark Office patent files or records, but otherwise reserves all copyrights and similar rights whatsoever. © Copyright Apple Computer, Inc.

A system and method for organizing information stored in a file system of a computer system will now be described in detail. The following description, specific steps, procedures, commands, and other specifics are set forth in order to provide a thorough understanding of the present invention. However, it will be apparent to one skilled in the art that the present invention may be practiced without the specific details. In other instances, well known systems and methods are shown in diagrammatic form or not shown at all in order to not obscure in unnecessary detail the present invention.

Figure 1:
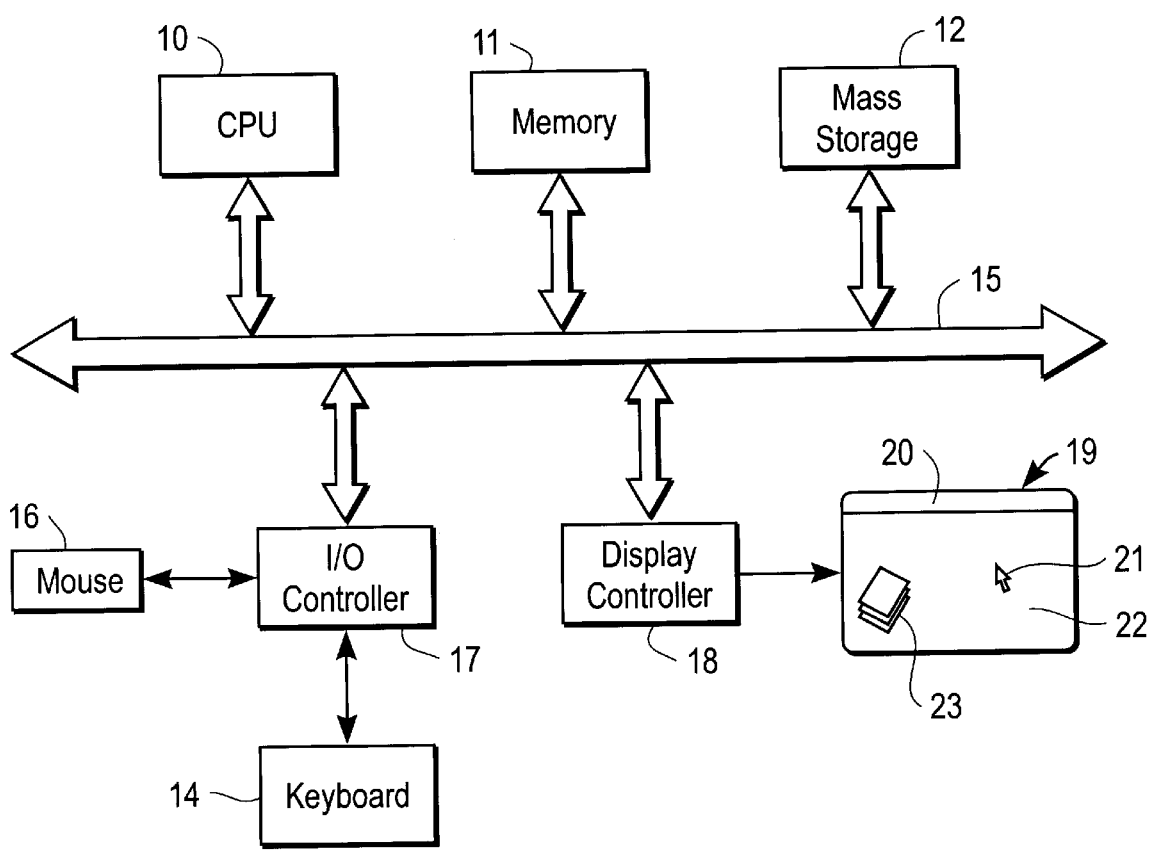
FIG. 1 shows an embodiment of a computer system of the present invention.

The computer filing system of the present invention is part of the computer system shown in FIG. 1. The computer system includes a processing means 10, such as a microprocessor, a memory means 11, such as system RAM, and a mass storage means 12, such as a hard disk or other storage means having a high capacity for storing documents and other information maintained by the filing system. The processing means 10, the memory means 11, and the storage means 12 (which its own I/O controller) are interconnected by a system bus 15 which includes control signals as well as address lines and data lines for sharing information, including data and instructions, between the components of the computer system. Also connected to the system bus 15 is the I/O controller 17 which controls the signals received from the keyboard 14 and the mouse 16 and provides those signals, which indicate instructions from the user, to the computer system. The display controller 18 is coupled to the system bus 15 and receives commands and data from the processing means 10 and from the memory means 11 via the system bus 15. The display controller 18 controls the display device 19 in order to provide images on a display screen 22. It will be appreciated that the typical computer system includes a bit mapped screen stored in memory, which may be a dedicated frame buffer memory or the system memory. As shown in FIG. 1, the display means 19 displays on its display screen 22 a cursor 21 which is controlled by the cursor control device shown in FIG. 1 as a mouse 16. The display means 19 may be any one of a variety of known display systems, such as a video (CRT) display monitor or a liquid crystal display.

The cursor control device of the present invention may be substantially identical to the cursor control means shown in U.S. Pat. No. Reissue 32,632. However, it will be understood by those in the art that many other types of cursor control means may be utilized, such as graphic tablets, touch tablets, trackballs, pen input mechanisms, touch screens, etc. Indeed, any device capable of indicating x-y locations and capable of controlling a cursor on a display means of the computer system may be utilized in the present invention as the cursor control device. The cursor control device, such as a mouse will often include a signal generation means which typically includes a switch connected to a button. A user presses the button to send one signal to the computer and releases the button to send another signal to the computer. Other signal generation means, as is well known in the art, may be used such as using certain keys on a keyboard or using a pen input device which both positions a cursor and, by pressing the pen's tip against the display screen, selects the item pointed to/pressed at on the display screen.

The display means 19 of FIG. 1 is shown displaying a pile 23 to the left of the cursor 21. A menu bar 20 (described in U.S. Pat. No. 4,931,783) is also displayed at the top of the display screen 22. In the preferred embodiment of the present invention, the file system operates on a Macintosh computer of Apple Computer, Inc. of Cupertino, Calif. In this computer system, the user controls the position of the cursor 21 to point to an item and then to perform an operation with that item by using the signal generation means, such as the button on the mouse, to signal to the computer that the item has been selected for an operation or to signal to the computer that a particular command has been selected by the user (in the case of the selection of commands from the menu bar 20 or representations of the command displayed elsewhere on the screen 22). The operation of pointing to an item and selecting the item (or a command if a command is pointed to) is well known in the art as a "point and click" operation. For example, to select the pile 23 shown in FIG. 1 for an operation to be designated by the user, the user positions the cursor 21 over the pile 23 by moving the mouse 16 in an x-y direction to cause the cursor to be positioned over the pile 23 on the display screen 22. Then the user signals to the computer that the item has been selected by depressing and releasing the button on the mouse (causing the switch under the button to change from a first state to a second state and then back to the first state). Other methods are known in the art for selecting an item which is displayed on a display screen of a computer system. For example, it is know that an object (e.g. document) in a computer filing system having a graphical user interface may be selected without pointing a cursor at the object by, for example, using the tab key on the keyboard to 'tab through' the various objects displayed on the screen. The currently selected object on the screen will typically be highlighted to convey to the user the fact that it is currently selected for an operation which is occurring or will occur upon further user instruction.

Figure 2A:
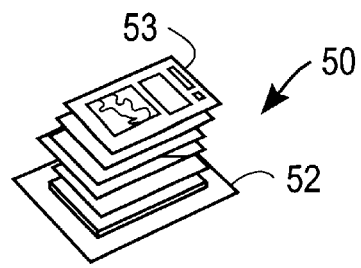
Figure 2B:
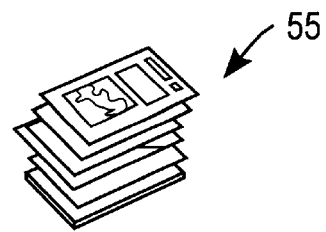
Figure 2C:
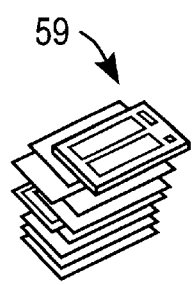
Figure 2D:
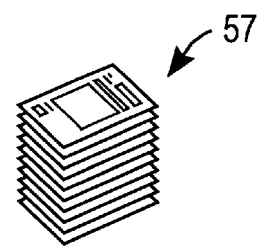

The user interface of the present invention will now be described. FIGS. 2a, 2b, 2c and 2d show various embodiments of the graphical representations (e.g. icons) of the piles (or collections of documents) of the present invention. FIG. 2a shows the preferred embodiment of a graphical representation for a pile; this graphical representation 50 includes a base 52 above which are a collection of documents 53. According to the preferred embodiment, each document in the pile represented by the graphical representation 50 may be a miniature of the first page of the actual document or an icon of the document type, a set of keywords related to the document or a set of attributes relating to the document. In this manner, the first page of the document serves as a proxy (indicia) indicating the content of the document, thereby providing the user with information concerning what the representation represents (i.e. what is contained within the document). FIG. 2b shows an alternative embodiment of the graphical representation of a pile according to the present invention. The graphical representation 55 of FIG. 2b includes a collection of document icons which have been stacked together in a somewhat disheveled form to represent a pile or collection of documents. FIG. 2c shows a pile which is similar to that shown in FIG. 2b except less information is provided by each icon which represents a single document. Also note that the pile of FIG. 2c is disheveled, which the user may instruct the computer to portray when a pile is not organized by the system. FIG. 2d shows one graphical representation 57 of a pile which is organized by the system and thus appears as a neat stack of documents as shown in this figure. A pile organized by the system as a result of a user or system supplied script could also appear organized (e.g. not disheveled). This is one possible representation of the attribute of having a script; other attributes include the base having a texture, a pattern, some text on the pile, or an outline around the pile or an indication in the name of the pile. The graphical representation of a pile may be either a dynamic graphical representation, as in the preferred embodiment, or a static graphical representation, such as a typical icon used in computer systems having graphical interfaces. A graphical representation generally is any item or feature displayed on the display screen of the computer system. The dynamic graphical representation of a pile increases in height when a document is added to the pile and decreases in height when a document is removed from the pile. The icon for each document in the pile may be selected by positioning the cursor over the icon in the pile. In the case of a static graphical representation of a pile, a document is selected based on a mapping of the height position of the cursor relative to the total height of the pile's graphical representation; that is, the ratio of the cursors height above the base of the pile to the total pile height is mapped to the document's location in the pile. For example, a ratio of ¼ (cursor is one-quarter up from base) maps to selecting a document which is one-quarter from the bottom of the pile which in the case of a pile with 8 documents is the second document from the bottom. This mapping is similar to how scrolling boxes on windows operate and will be appreciated by those in art.

Figure 2E:
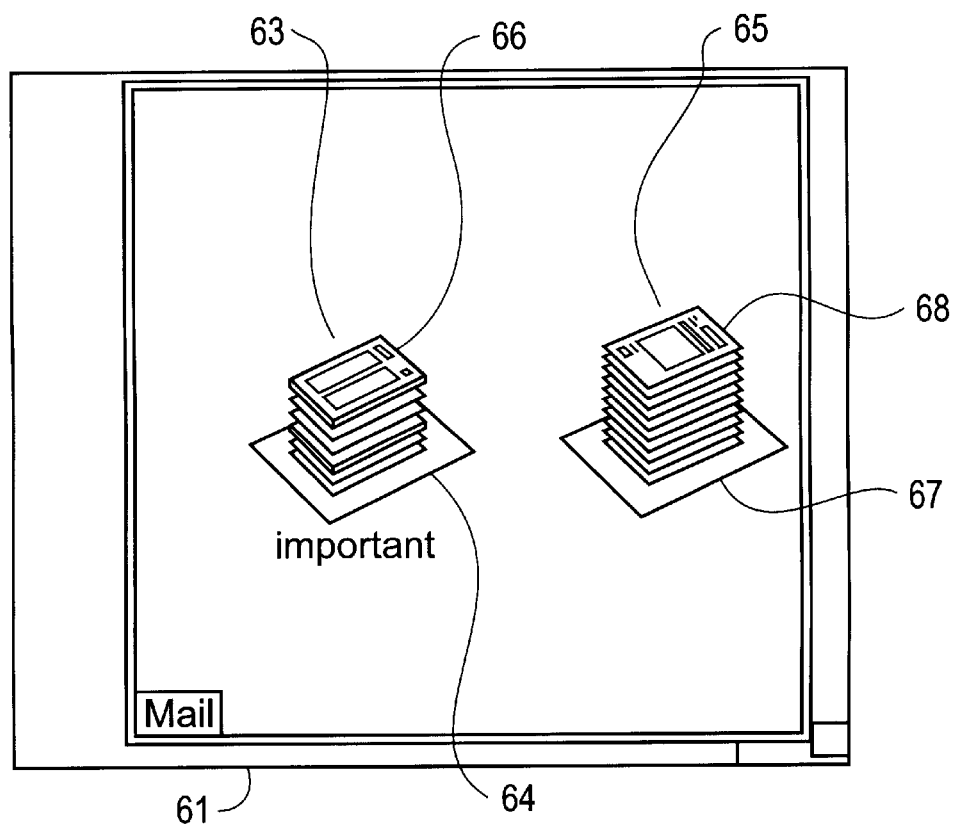

FIG. 2e shows two piles 63 and 65 having bases 64 and 67 respectively on top of which are stacked graphical representations 66 and 68 respectively, which graphical representations represent the collection of various documents in each pile which are stored in a memory (e.g. hard disk) by the filing system of the invention. Note that the pile 63 includes graphical representations of documents within the pile which indicate the thickness of the document relative to other documents. Alternatively, a different color could be used for various documents and a different texture could be used for different documents to convey information to the user. The base 64 of FIG. 2e and the base 52 of FIG. 2a are each a means for selecting the entire pile or collection of documents for an operation on the entire pile (rather than an operation on an individual document or group of documents within the pile). Operations on an entire pile including moving a pile across the desktop on the display screen or opening the pile to show its contents in a window. Other means for selecting a pile include a top means, such as the paperweight 54 shown on top of the pile 56 in FIGS. 2h and 2i (FIG. 2h shows the pile in a 'closed' form where there is no viewing or browsing of documents in the pile and FIG. 2i shows the pile 56 in an 'open' form with the paperweight 54 lifted to reveal the cursor 60 pointing to a selected document 58), and a wrapper means, such as band 71 which wraps the pile 70 in FIG. 2j or the band 74 which wraps the pile 72 in FIG. 2k and pile 73 in FIG. 2l. The means for selecting effectively identifies the documents in the pile as a unified collection of documents.

Piles 63 and 65 are displayed in a mail window 61 which contains electronic mail documents received over a network system or other electronic mail system. It will be appreciated that the method and apparatus for organizing information in the computer system according to the present invention has particular relevance to electronic mail and to other documents where the user does not know the content of the documents. In the case of electronic mail, the user will not typically know the content of a mail message received from another computer user (e.g. over an electronic mail network system) and the computer system will typically collect mail documents from various other user's and accumulate them in a particular location (e.g. a mail window such a mail window 61) from which the user may find each mail message and read each mail message. The automatic filing into piles and subpiling and classification methods of the present invention are particularly useful in this mail/message environment. For example, the user may instruct the system to collect mail documents into a pile and then have the system create subpiles or search a pile of mail documents according to the invention and then create subpiles from documents found in the search. These various operations are described below.

Operations and actions relating to piles will now be described. FIG. 3 shows three groups 101, 110, and 112 of documents which are related in time in that a user performs an operation as shown in group 101 and the computer completes the operation and shows the progress of the completion of that operation in groups 110 and 112. That is, group 101 shows the action of a user in the computer system of the present invention and groups 110 and 112 show two successive stages in time of the response of the computer system to the operation of the user shown in group 101.

FIG. 3 shows the process of creating a new pile where the user performs the operation shown relative to group 101. In particular, the user positions the cursor 106 over one document 105, selects that document and then moves that document (drags the document) over to the document 103 such that the document 105 and/or cursor 106 is positioned over document 103. In this situation, document 105 will overlap document 103. Then the user signals to the computer to create a pile; in the preferred embodiment, this is accomplished by releasing the mouse's button which was depressed when the user selected the document 105. For a better understanding of the preferred embodiment of creating piles a more detailed description will now be provided.

The user positions the cursor 106 by using a cursor control device such as a mouse 16. The cursor is positioned over the document 105 and then the user signals to the computer that the document is to be selected by activating a signal generation means, which in the preferred embodiment occurs by depressing the button on the mouse to indicate the selection. While keeping the button depressed (which continues to indicate to the computer that the document is still selected)

the user then uses the cursor control device (e.g. mouse) to move the cursor and the document 105 such that it is moved over the document 103. When the cursor is positioned over document 103, the user releases the mouse button which changes the signal presented to the computer indicating that the document 105 is to be placed in a new pile with document 103. In this manner, a new pile is created having documents 103 and 105. Upon releasing the mouse's button when the cursor 106 is over document 103, the computer is thereby instructed to create a new pile, and a display of the computer reveals an animation indicating the process of creating a new pile. As shown in group 110, the animation by the computer includes a step where document 103 is rotated and slightly inclined while document 105 begins to be rotated and placed downwardly on top of document 103. At the end of the animation by the computer system, the pile shown in group 112 results containing documents 105 and documents 103 both of which are on top of the base 114. Typically, the separate graphical representations of documents 103 and 105 will disappear from the screen leaving the new pile on the screen. In the filing system of the computer, one way of filing documents into a pile includes placing documents 103 and 105 in a subdirectory which is designated as a type of subdirectory which is similar to the subdirectory that a folder represents. Other ways of managing documents in a pile will be evident to those in the art. This subdirectory is maintained in the conventional manner by the filing system for the information stored in the computer system (e.g. on the mass storage device). Other methods for creating a pile may be employed. For example, the user may select two documents and then select a command, such as "create new pile" provided by the computer system which creates the pile by removing the separate graphical representations of the two selected documents and displays the graphical representation of the pile and then modifies the pathname of both documents to reflect the fact that they are now in a pile which is a new form of a subdirectory or alternatively aliases of the documents could be added to the pile. The pathname, it will be appreciated is typically an attribute of a file, document or pile which is maintained by the filing system. Alternatively, the filing system may provide the user with an empty base for placing documents thereon to create a new pile.

After the pile as been created, the user or the system can perform numerous actions on the pile, and one such action is referred to as browsing where the user views indicia of documents in the pile without opening the document or the pile.

FIGS. 4a, 4b, 4c, 4d and 4e reveal various embodiments for browsing a pile according to the invention. The graphical representation of pile 151 is shown in FIG. 4a as a collection of documents 153 which are stacked on top of a base 152. The cursor 154 is shown as located on top of the collection 153. In the preferred embodiment of the present invention, the user positions the cursor 154 over the graphical representation of the pile and allows the cursor to remain positioned over the pile for a predetermined period of time. After that predetermined period of time, the computer system displays a view cone 162 with a proxy 161 in order to allow the user to browse through the documents in the collection of documents comprising the pile. As shown in FIG. 4a, the view cone 162 points to or is connected on one side (the apex or smaller side) to the collection of documents, and the apex is positioned to correspond to the document which has been selected for viewing in the browsing environment. The other side of the viewing cone 162 shows a proxy 161 which is, in one embodiment, a miniature of the first page of the document which has been selected for browsing. The cursor 160, as shown in FIG. 4a, has been positioned over this document which indicates that the proxy 161 is for the first document in the pile 156. The user may select any document within the pile by moving the cursor on top of a particular document in the pile 156 and sending a signal to the computer to select the document. Once browsing has been invoked and the view cone has been displayed, the cursor need not be positioned for a predetermined period of time over an item in order to make the view cone and the proxy appear. In other words, once the system has been instructed by the user to allow browsing of documents within a pile, the system displays the appropriate proxy for the selected document in the pile on demand by the user without waiting for a predetermined period of time. Once browsing has been invoked, the user may quickly scan through the pile by moving the cursor up and down the pile; in this manner, each time the cursor comes to a representation of a document in the pile, the system displays the proxy for that document within the view cone 162. The left side (apex) of the view cone as shown in FIG. 4a originates from the selected document and the right side (base) of the view cone shows the specific proxy (indicia) relating to that document. It will be appreciated that the view cone provides a means for indicating the position of the selected document in the pile when browsing the pile in that the apex points to the selected document. Browsing may be terminated by the user by moving the cursor away from the pile such that it is no longer positioned over any document area of the pile, including any documents stacked on top of the base which are associated with the pile. Browsing may also continue if the user positions the cursor over the base; in this case, the proxy may reveal the script of the pile or an internal representation of the pile itself rather than of a document in the pile.

In the preferred embodiment, the appearance of the proxy is dependent on the type of pile and the context of its use. For example, if the pile originates from an electronic mail system which accumulates documents in the pile, then the proxy 83 in the view cone 82 shown in FIG. 4f for the selected document 81 in pile 80 is shown. This proxy 83, typically used for mail documents, conveys more information to the user in the case of a mail document than a miniature of the document which the user probably has not seen. This proxy 83 is generated by using the most characteristic words (e.g. "design, competition . . . ") in the document as indicated by the document's internal representation, which is described below, and by using information from certain fields (e.g. "To", "Re", and "Date") contained in the document. Other alternative examples of proxies include the proxy 190 shown in FIG. 4e which might be used when the user has asked for information about a document which is relevant to the operation of the computer's filing system (e.g. the size of a file when placed on a disk, such as the mass storage of FIG. 1). The appearance and content of the proxy may be provided by the application program which created the document, particularly in the case of the miniature of the document; this occurs when the computer's filing system provides a system call to the program which created the selected document (the conventional filing systems typically keep track of this information) and the system call is recognized by the program as a request for the proxy of the selected document, and the program responds by providing the proxy to the filing system which proxy may have been previously created by the program by miniaturizing (e.g. pixel averaging or other methods known in the art for reducing resolution and size of an image or exaggerating characteristics of the document) the full-size reproduction of the document.

FIGS. 4b, 4c and 4d show alternative embodiments for browsing. The browsing embodiment of FIG. 4b graphically appears the same to the user as the embodiment shown in FIG. 4a except that as the user moves from document to document while browsing (e.g. by moving the mouse up and down through the pile) the computer system makes a noise indicating movement from one document to the next document. This noise may be a simple click or the sound of a briefcase closing or some other sound which assists the user so that the user realizes there is a change from one document to the next. This is particularly helpful where the pile is tall and small movements of the cursor causes the view to change from one document to the next. FIG. 4c shows an alternative graphical representation of the browsing operation according to a particular embodiment of the present invention. In this embodiment, the document 174 has been selected for browsing and a proxy 175 of that document can be seen at the end of the view cone 176. The cursor 171 is positioned over the selected document, document 174, and the documents in the pile 170 which are above the selected document are moved slightly to the left and are shown as a collection of documents 173. The embodiment shown in FIG. 4d, which has been labeled as pile 180 is similar to pile 170 in FIG. 4c except that when browsing, no view cone and no proxy within the view cone is shown to the user; in this situation, the proxy is typically a miniature of the document. In this embodiment, the collection of documents 173 above the selected document during the browsing operation is moved above and to the left so that the user may see the selected document 174.

FIG. 4e shows yet another alternative embodiment for the browsing operation where, instead of a proxy which shows the first page miniature of the selected document, the view cone displays system information which is typically maintained in a computer filing system such as the title of the document (Gesture Annotation), the type of document (MacWrite II document), the amount of information on the disk controlled by the filing system, and the date the document was created as well as an icon which is a representative of the document. Note that in this embodiment, the view cone 188 emanates from the selected document and the collection of documents 185 above the selected document moves to the left and above of the selected document so that the user may see the document which has been selected in pile 187. Note that this pile 187 of FIG. 4e includes a base 186 and below that base is a rectangular box containing the name of the pile which has been given by the user. Typically, the computer system will prompt the user immediately after a new pile has been created in order to obtain from the user a name for the file. As will be described below, the system may automatically provide or suggest names for a pile.

The proxies which are shown within the view cone need not necessarily be a physical resolution reduction of the original of each page of the document. To refresh the user's memory about the document, certain features of the document may be exaggerated (e.g. if the document is a spreadsheet a grid may be exaggerated on the proxy to represent the spreadsheet). If the document contains a user created annotation, the annotation may be exaggerated. Similarly, if the document contains a drawing, the image of the drawing may be exaggerated by making it larger relative to the rest of the miniature. The user may select the manner in which the proxy appears. It will be appreciated that if a folder is placed within a pile the proxy for the folder may itself be the icon of the folder or may be a representation showing documents within the folder (e.g. an icon of a folder is displayed with smaller icons representing documents shown within the folder). The user may page through a particular document which has been selected during the browsing operation by using a command to indicate to the computer to step through the pages of the document. In one embodiment, the user may use the left and right arrow keys on the keyboard to instruct the computer to page through the document which has been selected during the browsing operation. The computer will then display miniatures of each page as the user presses the left or right key. For example, starting from the first page of the document the user may press the right key three times in order to page through all pages of a four page document; having reached the end of the document after the third key press, the user may depress the left arrow key three times to get back to the first page or may select a new document for browsing by moving the cursor to a new document.

Alternative methods for scrolling through the pages of the proxy will be apparent to those in the art, including a thumb roller knob on the mouse 16 which allows the user to roll the knob to scroll through the pages.

It will be appreciated that many variations for the browsing operation may be produced according to the invention.

For example, browsing may only allow viewing of certain types of documents selected by the user. In particular, if the user selects a selective viewing mode, then only a user specified type of document (e.g. only documents containing drawings) is shown during browsing; for instance, if the user selects this mode and specifies that only documents containing a "To" field or documents containing a chart will be shown during browsing, then the user eliminates unnecessary information by filtering, in effect, such information.

Figure 4H:
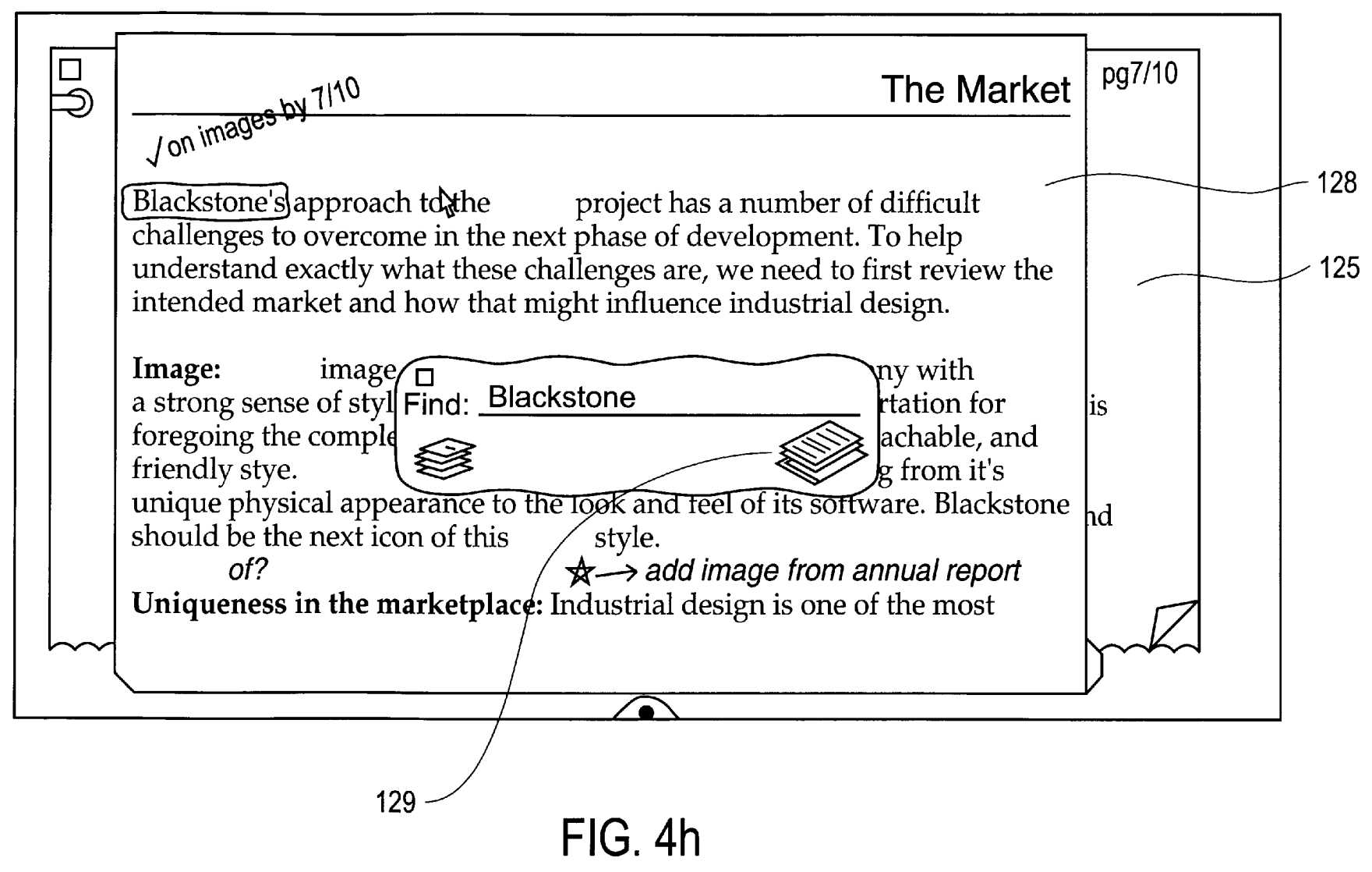
Figure 4I:
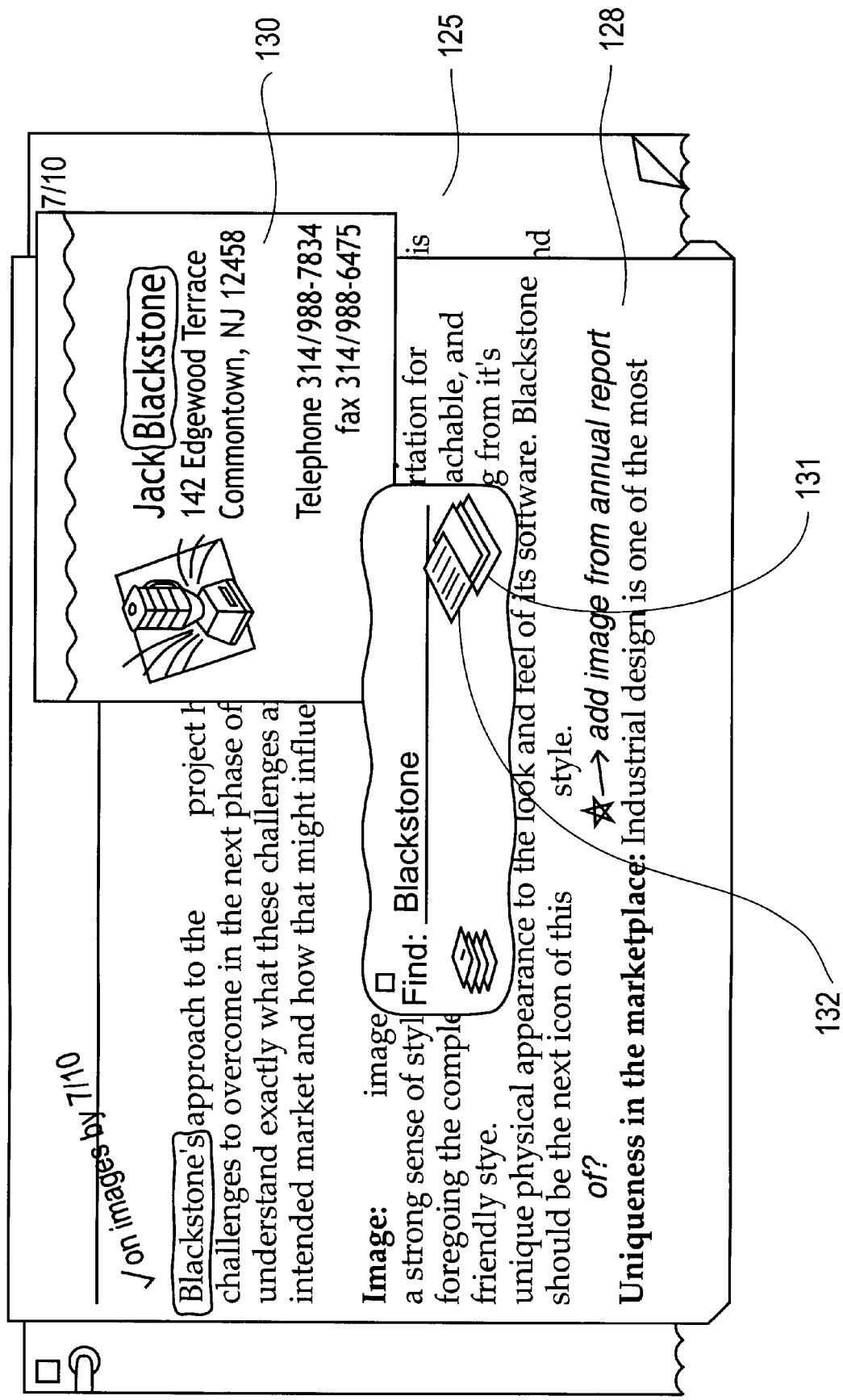
Figure 4J:
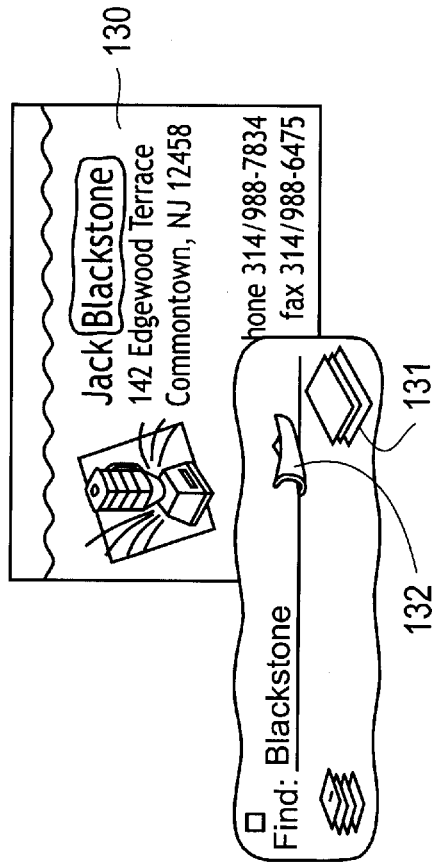
Figure 4L:
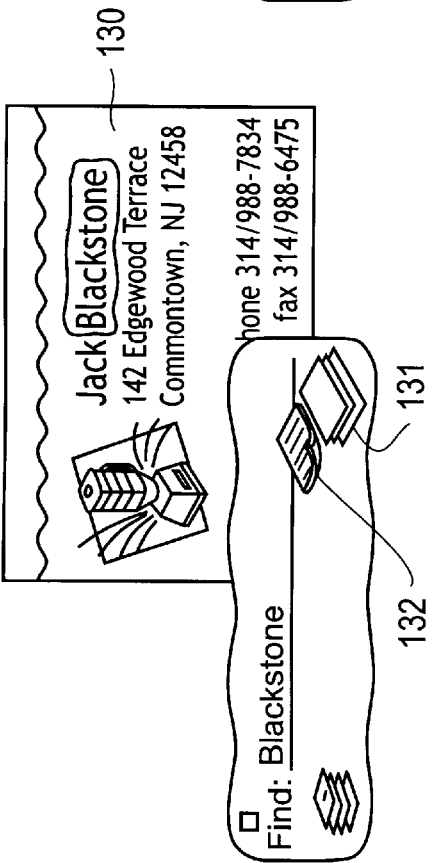
Figure 4K:
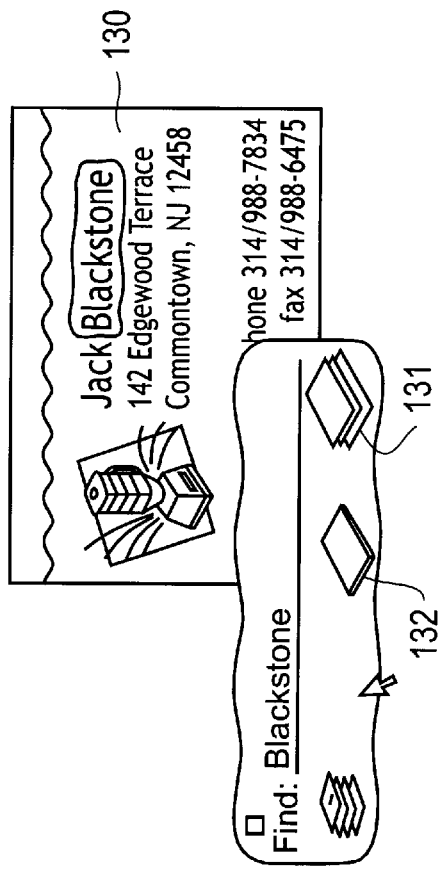

FIGS. 4g, 4h, 4i, 4j, 4k, 4l and 4m show another embodiment for viewing the contents of a pile, which in this embodiment results from a search of documents stored in said computer system. FIGS. 4g–4m show the embodiment over various stages of time, beginning with a users request for a search of the term "Blackstone" in the documents stored in the system, as shown in FIG. 4g prior to initiating the search. This embodiment may be performed in a pen-based computer system having a graphical user interface controlled by a pen (or stylus input) and touch screen which is sensitive to the placement of the pen or stylus on the screen. These computer systems are known and the pen provides both cursor positioning functionality as well as the selection functionality in one operation; that is, the pen positions the cursor and selects an object with the same gesture/operation.

Figure 4M:
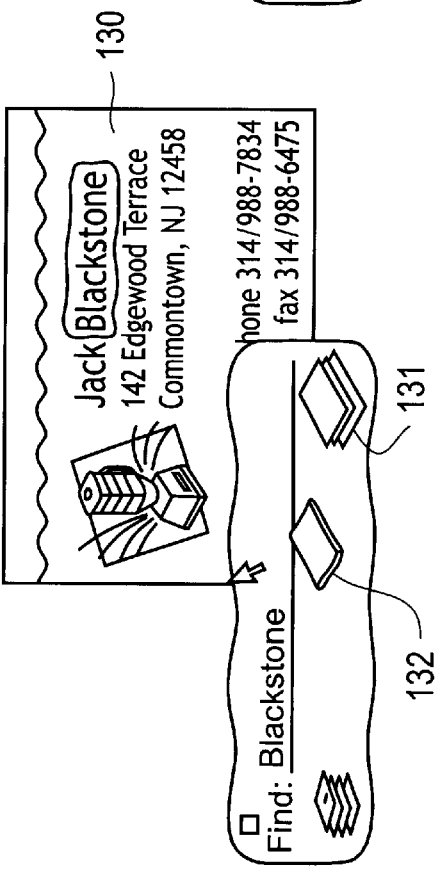

As shown in FIG. 4g, the user has indicated to the computer that a search of documents in the system for a word is desired, causing the computer to display a find dialog box with the "start" button 127 displayed in front of a document 125. The user enters in the term "Blackstone" and then selects the "start" command by selecting the "start" button which causes the computer to search for documents containing the desired term. The computer displays, as shown in FIG. 4h, a pile 129 which contains the documents found in the search, which may be performed according to the methods described below, and the computer displays the first document 128 in the pile. Note that the indicia (e.g. document 128) in this embodiment is a full-size reproduction of the document. Then the user, selects the next document in the pile 129 for viewing by selecting the next document in pile 129; this could occur by the user pointing the stylus input device at the pile 129 or at the next document in pile 129. This action by the user causes the system to respond initially with the image shown in FIG. 4i and then with an animation where an icon 132 of the document which has been viewed lifts up from and away from the pile 131 and flips over as it moves away from the pile 131 to a location near the pile. This animation is shown in successive stages over time in FIGS. 4i, 4j, 4k, 4l and finally 4m. The next document which was selected from pile 129 is shown behind the graphical representation of the pile 131 and behind the find dialog box. FIGS. 4j, 4k, 4l and 4m have not included the document 128 in order to save space in the drawings. In this embodiment, the system manages the pile for the user during browsing so that documents which have been viewed are put in a 'viewed' subpile (containing the document icon 132 as shown in FIG. 4m) and unviewed documents remain in the original pile 131. When viewing is completed the user may reassemble the original pile by adding the 'viewed' pile back to the original or may separate the 'viewed' pile by removing these from the original pile. Without an affirmative act by the user, the 'viewed' subpile will remain part of the original pile after viewing of the search pile is completed.

Note that in many of these browsing operations the pile remains visible either in its original form or in slightly modified form. This is unlike prior computer systems which have subdirectory "containers" such as folders which might disappear or be obscured from view when the container is opened to view the contents of the container. That is, the user can maintain the context (e.g. the graphical representation of the pile and all other items on the desktop remain visible) of the filing system while browsing a pile unlike the situation with examining folders in a typical filing system with a graphical user interface. The proxy of the invention, with or without the view cone, may also be used with any icon or object on a desktop in a graphical user interface to permit browsing/viewing of the icon or object without losing the context of the filing system. For example, browsing of the contents of a conventional folder could produce a proxy for each document (or selected types of documents) within a folder, such as the folder 312 shown in FIG. 8a. In particular, the user positions the cursor over the folder for more than a predetermined period of time and, while the icon of the folder remains visible, the proxy of a document appears next to the icon of the folder. In one embodiment, the particular document selected depends on the mapping of the ratio of the vertical position of the cursor relative to the bottom of the folder to the location of the document in a listing of the contents of the folder, in the same manner described above for browsing a static graphical representation.

The operation of moving a pile will now be described by referring to FIGS. 5a and 5b. FIG. 5a shows a graphical representation 201 of a pile with a base 203. As shown in FIG. 5a, the user has positioned the cursor 204 over the base 203. With the cursor positioned over the base 203 the user then selects the pile and moves the cursor by manipulating the cursor control device while keeping the pile selected. In this manner, the pile follows the movement of the cursor and is moved around the display screen 22 of the computer system. In the preferred embodiment, the selection is indicated by using a signal generation means such as a mouse's switch to signal to the computer that a selection has been made at the location of the cursor and moving occurs by keeping that switch in the same state while moving the mouse to move the cursor. When the user has moved the pile to the location which is desired, the user indicates to the computer that the move is over. In the preferred embodiment, the user releases the switch's button on the mouse, which switch remained in a depressed state since the selection of the pile. At end of the move, the pile is shown at the location where the user released the switch. During the move, either an outline of the pile or a facsimile of the pile's graphical representation may follow the cursor around the display screen 22.

The alternative embodiment of the move operation is illustrated in FIG. 5b, where the pile 205 does not have a base. The user positions the cursor 204 over the pile 205 and signals to the computer that the pile has been selected for a move by depressing the mouse's button which causes the switch to change its state in the mouse. Then the user manipulates the cursor control device in order to move the cursor and the graphical representation of the pile or the outline of the pile follows the cursor until the user releases the mouse button in order to deposit the pile at the desired location at the end of the move.

Adding an item to the top of a pile is shown in FIG. 6. FIG. 6 shows the same pile at different stages in time of the operation of adding an item to the top of the pile; specifically, three stages or groups, 220, 221 and 222 are shown in FIG. 6. The initial stage 220 is the one in which the user instructs the computer to add the item to the top of the pile, and stages 221 and 222 show the animation displayed by the computer system as a result of the user's operation. In the first stage 220, the user positions the cursor 231 over a document 230 and moves that document (in the well known manner of moving an icon in a graphical user interface, such as the Macintosh finder) so that the cursor is positioned over the pile 224. When the cursor 231 is placed over the pile 224 and the system provides feedback to the user by highlighting the pile and then the user signals that the move operation for document 230 is over, then the system responds by implementing stages 221 and 222 which cause the document 230 to be added to the pile. Typically, the user will signal the end of the move to the document 230 by releasing the mouse's button while the cursor is positioned over the pile 224. The computer then responds as shown in stage 221 of FIG. 6 by inclining and rotating document 230 to show the animation of placing the document 230 on the pile 226. At the end of the computer's operation, (shown as stage 222 of FIG. 6) the document 230 is shown on the top of the pile 228. The operation of placing the document on the pile is similar to the operation of placing the document within a folder of a graphical user interface filing system in a computer in that, in one implementation, the pathname for the document which is maintained by the filing system is modified to include the name of the pile in the complete path name for the document. The user can have gross or fine grain control over the placement of documents on the pile, as will be discussed in conjunction with FIGS. 11a, 11b, 12a and 12b.

The operation of adding an item to the middle of the pile will now be described by referring to FIG. 7 which shows three stages in time 251, 253 and 255 for this operation. In stage 251 the user moves the document 256 over to the pile 250 and positions the cursor (while keeping the document 256 selected) over an inner zone of the pile 250. Further details regarding the inner zone of the pile will be described below with reference to FIGS. 12a and 12b and particularly FIG. 12b. When the cursor 252 has been kept in the inner zone for a predetermined period of time then the computer responds by presenting on a display means 22 the graphical representation shown in stage 253 which includes the pile 250 (now slightly modified) and view cone 257 with a proxy 258 within the view cone. The proxy shown within the view cone 257 is of the document which is immediately below the document 256 and the cursor 252. It will be appreciated that in effect, the browsing mode has been activated and the user may move the cursor up and down within the pile to browse through the pile. In this operation, however, the mouse button is down (depressed by the user) as the cursor is moved up and down unlike the browsing operation described above in the preferred embodiment. As soon as the mouse button is released by the user during this operation shown in stage 253, the document 256 will be deposited on top of the current item within the pile which is also shown within the view cone 257. The currently selected item may be changed by browsing up and down over the pile by moving cursor up and down over the pile. As shown in stage 253 of FIG. 7, if the cursor 252 were kept in its position shown in stage 253 and the mouse button released, then the document 256 would be placed on top of the folder, the proxy of which is shown as proxy 258 within the view cone 257. This results in stage 255 in which the pile 259 is shown with the new document 256 added in the middle of the pile; the document 256 will have been added immediately above the folder the proxy of which is shown as proxy 258 at stage 253.

In addition to browsing a pile in the manner described above, the present invention provides a method and apparatus for obtaining an alternate view of the contents of a pile; various embodiments for obtaining an alternate view are shown in FIGS. 8a, 8b, 8c and 8d. In the embodiment shown in FIG. 8a, the user obtains an alternate view of the pile by positioning the cursor 303 over the base 302 of the pile 301 and rapidly depresses and releases the mouse button twice, which causes the computer system to respond by making the pile 301 disappear and making a region of the display screen, such as a window 304, appear containing contents of the pile spread out in the manner shown in FIG. 8a. Other methods for obtaining this alternate view will be appreciated by those in the art, particularly by referring to the art relating to graphical user interfaces for computer filing systems. For example, the user may select the pile and then select an "Open" command from a pull down menu 20. As shown in FIG. 8a, graphical representations of documents 310, 311, folder 312, and documents 313, 314 and 315 are shown within region or window 304. According to the present invention, items in the pile are arranged in a grid within the window 304 and top to bottom order of the pile is preserved in a left to right format. The standard window operations are provided by window 304 and the computer's operating system; these standard window operations are well known and are available in graphical user interfaces with windows, such as the Macintosh Finder from Apple Computer, Inc. of Cupertino, Calif. Thus, for example the graphical representations of the documents or folders within the window 304 may be moved within the window or moved outside of the window, or a document such as 310 or 311 may be moved into folder 312, etc. The window 304 may be removed from the screen ("closing the window") by positioning the cursor 303 over the region 305 shown in the upper left hand corner of the window 304 and by depressing and releasing the mouse button to activate the operation of closing the window which then causes the computer system to revert back to displaying the pile 301 as shown in FIG. 8a.

An alternative embodiment for obtaining an alternate view of a pile 320 is shown in FIG. 8b. In this embodiment, there is no base for the pile and thus the user cannot double click on the base of the pile. Rather, the user must double click on the pile itself which will cause the computer to remove the graphical representation of the pile 320 from the display screen means 22 and cause the appearance of the window 321 which contains the iconic representation to the various documents within the pile in a typical window for computer systems with graphical user interfaces. Other methods for obtaining an alternate view will be easily observed by combining the techniques of the invention with the skill of the art.

For example, FIGS. 8c and 8d show another embodiment for obtaining an alternate view of a pile. In this embodiment, the user moves the mouse 325 in a manner shown by the arrow 327 (moving the cursor back and forth in a horizontal fashion across the pile 326). This causes the pile 326 to be displayed in a spread out manner 330 shown in FIG. 8d. After the computer displays the pile in a spread out manner the user may provide an instruction to the computer to redisplay the pile 326 in the stacked format shown in FIG. 8c. Note that this back and forth horizontal movement is perpendicular to the vertical cursor movements (up and down a pile) to achieve browsing.

Figures 9A, 9B:
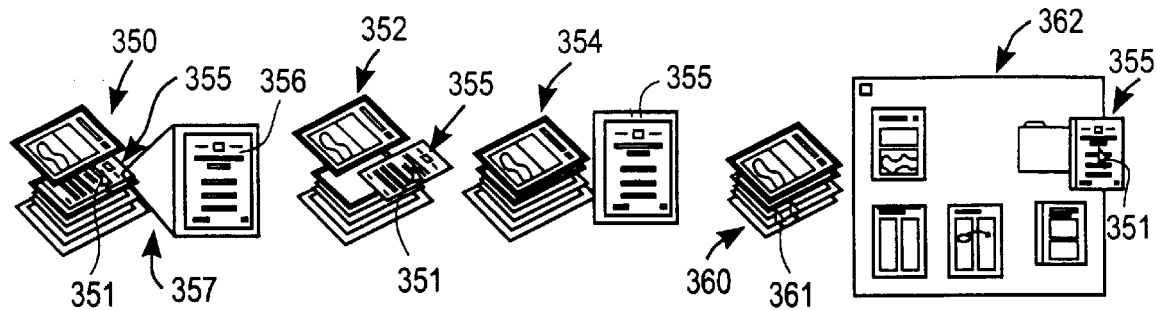
FIGS. 9a and 9b show, in temporal fashion, the operation of removing one item from a pile; two embodiments are shown.

Two different embodiments for the operation of removing an item from a pile are shown in FIGS. 9a and 9b respectively. FIG. 9a shows one embodiment in three stages of time 350, 352, and 354. In stage 350, the user positions the cursor 351 over the desired item 355 a proxy 356 of which is shown within the view cone 357. The user will check the contents of the view cone to determine whether or not the proper proxy is shown within the view cone which will then tell the user that the cursor is on the proper/desired document. Browsing of the pile may be employed to find the desired document. At this point, the user moves the cursor 351 so that it no longer is over a portion of the pile as shown at stage 352; note that the view cone and the proxy are no longer shown at stage 352 because the cursor is no longer over a region of the pile. The user continues the process by continuing to move the document 355 away from the pile as shown in stage 354 and when the user has moved the document far enough away from the pile the document 355 appears in its upright orientation and is no longer slanted relative to the generally rectangular region of the display screen 22. In the embodiment shown in FIG. 9b, in order to remove an item from the pile 360 the user must first obtain an alternate view of the pile—e.g. position the cursor over the pile and repeatedly press and release the mouse button twice ("double clicking") in order to cause the window 362 to appear. Other methods for obtaining this alternate view will be appreciated by those in the art, particularly by referring to the art relating to graphical user interfaces for computer filing systems. For example, the user may select the pile and then select an "Open" command from a pull down menu 20. At this point, the user may use normal operations for graphical user interfaces having windows in order to remove items from the pile. In particular, the user positions the cursor 351 over the desired item 355 and selects the document and keeps the document selected while moving the cursor out of the window thereby moving the document with the cursor out of window 362.

Figures 10A, 10B:
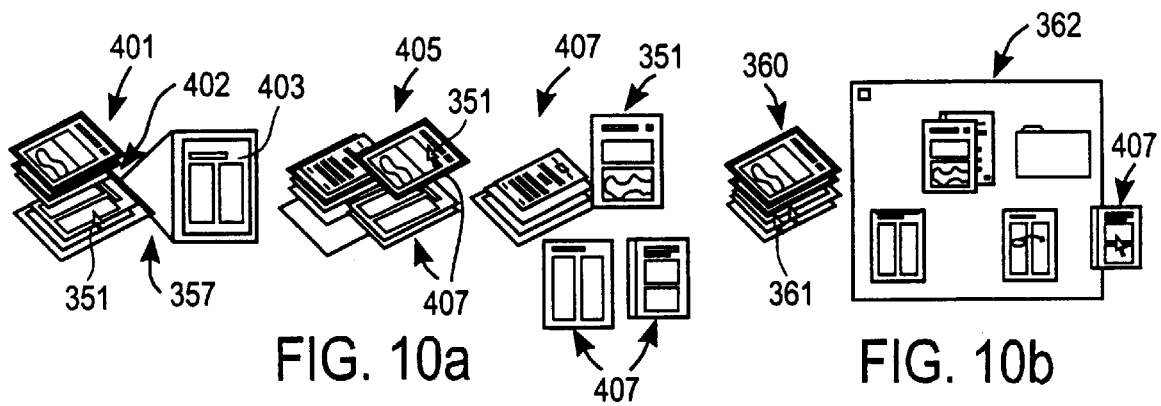
FIGS. 10a and 10b show, in temporal fashion, two embodiments of the operation of removing multiple items from a pile.

Two different embodiments for removing multiple items from a pile are shown in FIGS. 10a and 10b respectively. This operation in the case of the embodiment shown in FIG. 10a is shown in three stages 401, 405 and 407 which are three stages in time for this operation. The user begins the operation in the same way as described for the browsing operation by positioning the cursor 351 over the pile 402 for more than a predetermined period of time causing the view cone 357 to appear with its proxy 403. The user then depresses the mouse's button to signal to the computer that the currently selected document (as shown in the view cone with the proxy 403) is to be selected. Then the user signals to the computer that further items are to be selected; this is typically done by holding down a particular key of the keyboard or some other button to change the stage of the switch which is coupled to the computer system. In the preferred embodiment the shift key on the keyboard is held down while the cursor is placed on other documents which are desired. With the shift key down, the user may release the mouse button after selecting the first document and then press the mouse button down and release it to select additional documents. For each additional document which is to be selected, the user positions the cursor 351 over the document and presses and releases the mouse button while also holding down the shift key. As shown in stage 405, this results in three documents 407 being selected from the pile. The user then positions the cursor away from the pile and continues to move the cursor away. After moving the cursor outside of the region of the pile, the computer system causes the documents to revert to their upright non-inclined form as shown in stage 407.

The operation of removing multiple items from the pile not having a base is shown in FIG. 10b. In this operation, the user must first obtain an alternate view of the pile—for example, opening a window by double clicking the mouse button with the cursor 361 over the pile 360 thereby causing the window 362 to appear. Then the user selects multiple items in the well known manner for dealing with windows in filing systems with graphical user interfaces.

FIGS. 2f and 2g show two different embodiments which utilize an outer zone and inner zone for allowing the user to select between the creation of a pile where the user can control the appearance of the pile and the creation of a pile where the user delegates to the system the task of placing the document neatly on top of a new pile. An inner zone 77 is contained within the interior of the circle shown over an icon of a document 75 in FIG. 2g. The inner zone 77 is used to indicate to the computer system that the user desires to indicate to the computer system that the user desires to control the positioning of documents in the pile so that the appearance of the graphical representation of the pile is, at least to the extent of the orientation of documents in the pile, controlled by the user. An outer zone 76 is contained within the circle shown over the icon 75 excluding the region in the inner zone 77. That is, the outer zone 76 is an annular ring having two boundaries defined by the outer circle of FIG. 2f and the inner circle of FIG. 2g; this annular ring may be thought of as the subtraction of the area within the inner circle from the area within the outer circle. The outer zone 76 is used to indicate to the computer system that the user desires to allow the computer system to control the positioning of documents in the pile. The user may when adding one document to the pile use the inner zone 77 to control positioning, and then when adding another document to the pile the user may use the outer zone 76 to allow the computer system to control the positioning of the new document in the pile. The circles of FIGS. 2f and 2g would typically not be shown during use of the invention, and they are shown in these figures for purposes of illustration. The shape and size of the inner and outer zones is a design choice which may be varied to suit the user's desire. The operation of using the inner and outer zone will be described by referring to FIGS. 11a and 11b which use a different shape and size for the inner and outer zones.

Figure 11A:
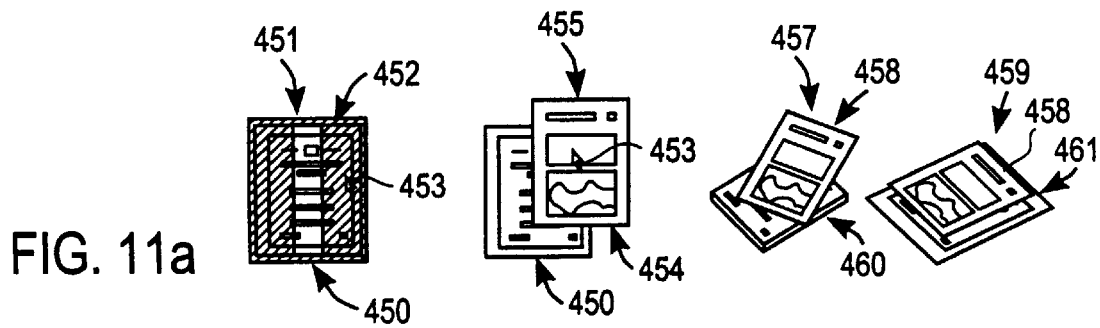
FIG. 11a shows, in temporal fashion, a particular embodiment for creating a pile with the use of an outer zone.
Figure 11B:
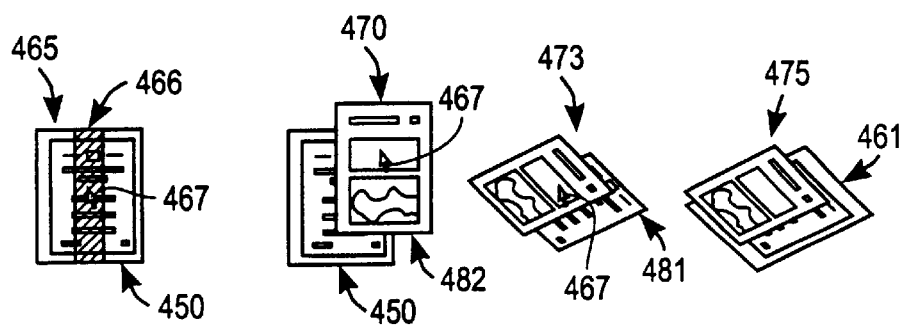
FIG. 11b shows, in temporal fashion, an embodiment for creating a pile with the use of an inner zone to allow fine positioning of the pile's appearance.

FIG. 11 a shows the circumstance where the user, by using the outer zone, allows the system to neatly place the document on top of the new pile, and FIG. 11b shows four stages of where the operation where the user creates a new pile and controls, by using the inner zone, the positioning of the documents in the pile and hence the appearance of the pile. In the embodiment shown in FIG. 11a, the user selects a document and moves the selected document on top of the document 450 shown at stage 451 of FIG. 11a. The document which has been selected is not shown at this stage in the figure in order not to obscure the outer and inner zones of the document 450. The outer and inner zones are not normally displayed during the use of the invention, and they are shown in FIGS. 11a and 11b for purposes of illustration. The user, having selected a document positions the cursor 453 over the outer zone 452 of the document 450 as shown in stage 451. This is also shown at stage 455 where the cursor 453 has been used to select document 454 and the document 454 and the cursor 453 have been moved on top of the outer zone of document 450. When the user releases the mouse button indicating that the document 454 is no longer selected, the computer responds with animation as shown at stage 457 where the document icons 458 and 460 are inclined and rotated and finally in stage 459 are shown deposited neatly on top of a base 461 as a new pile. The operation of creating the new pile causes the base 461 to appear. In an alternative embodiment of the use of the outer zone 452, the user moves the selected document over the outer zone 452 of the document 450 so that at least a portion of the inner zone (or some other central "hot spot") of the selected document (e.g. the inner zone of document 454) is over a portion of the outer zone of the document 450. Then the user indicates that the selected document is no longer selected (or that a pile is to be created) and the computer responds with the animation shown in stages 457 and 459 to create a neat graphical representation for the pile over the base 461.

The operation of creating a new pile while maintaining user control via the appearance of the pile is shown in FIG. 11 b and proceeds in a manner similar to that described for FIG. 11a except that the user positions the cursor 467 over the inner zone 466 of the document 450. Thus, as shown at stage 465 of FIG. 11b, the cursor 467, after having selected a document and moving the document and the cursor while keeping the document selected, is positioned over the inner zone 466 of the document 450. This is also shown at stage 470 of FIG. 11b where the cursor 467 is shown over the original document 482 which is selected, and the cursor 467 is also over the inner zone 466 (not shown). Upon the user's reaching the inner zone of the bottom document icon 450, the computer responds at stage 473 by inclining and rotating the document icons and then by observing the position the user indicates by moving the cursor 467 relative to the bottom, document icon 481. As long as the top document icon is left touching the bottom document icon, the computer follows the positioning of the top document relative to the bottom document and allows the user to position the document at any location. If the user moves the cursor outside of the bottom document icon such at the top document icon is no longer touching the bottom document icon then the computer system reverts back to showing two separate document icons which are not inclined and rotated. When the user is satisfied with the position of the top document icon relative to the bottom document icon user releases the selection on the top document (by releasing the mouse button) which causes the computer to respond as shown at stage 475 by creating a pile having a base 461 with the top document aligned according the user positioning of the top document relative to the bottom document as described previously. In an alternate embodiment of the use of the inner zone 466, the user moves the selected first document over the inner zone 466 of the document 450 so that at least a portion of the inner zone (or some other central "hot spot") of the selected document 482 is over a portion of the inner zone of the bottom document 450 for at least a predetermined period of time. Then the user indicates that the selected document is no longer selected (or that a pile is to be created) and the computer responds with the animation shown in stages 473 and 475 to allow the user to position the top document 482 over the bottom document 450 in the manner described above.

Figure 12A:
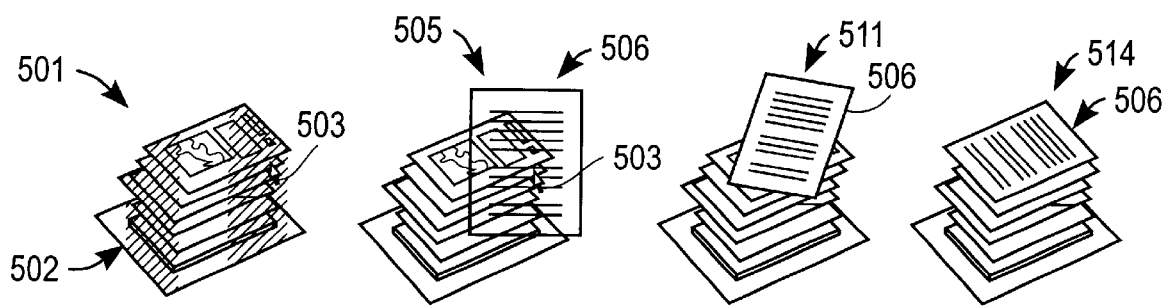
FIG. 12a shows an embodiment for adding to a pile using an outer zone.
Figure 12B:
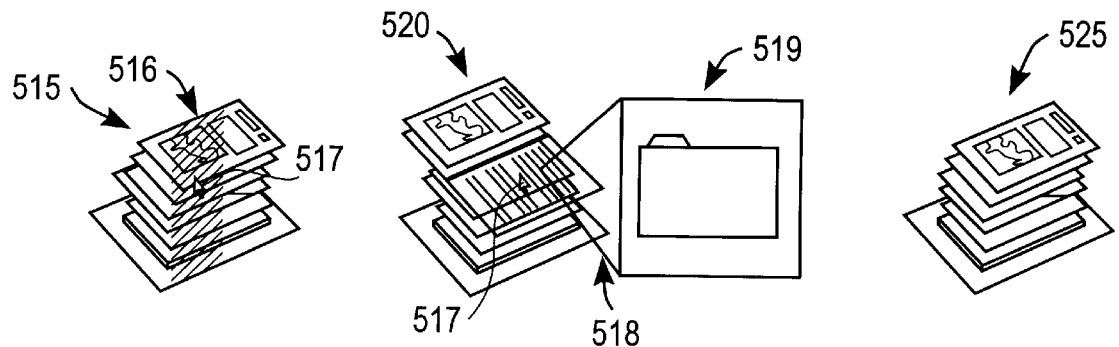
FIG. 12b shows a method for adding to a pile using an inner zone to allow fine positioning.

FIGS. 12a and 12b show the outer and inner zone designs respectively for the process of adding an item to a pile. The inner and outer zones are shown in FIGS. 12a and 12b for the purpose of illustration. The operation of adding to the pile and allowing the system to control the location of the new document, as shown in FIG. 12a, is similar to the operation described relative to FIG. 11a. In particular, the user selects a document and moves the document over to the pile and positions the cursor 503 (or alternatively the inner zone/hot spot of the selected document) in the outer zone of the pile as shown in stage 501. As shown in stage 505, the document 506 which has been selected and moved along with cursor 503 is positioned over the pile and the cursor 503 is positioned in the outer zone. Upon releasing the selection of the document while the document and the cursor is positioned over the pile and particularly the cursor is positioned over the outer zone, the computer responds at stage 511 by inclining the document 506 as it is positioned by the system on top of the pile. At stage 514, the operation is complete as the icon 506 is shown on top of the graphical representation of the pile, which representation is dynamic as illustrated in the figures. The operation shown in FIG. 12b allows the user to add a document anywhere in the pile. This is accomplished by selecting the document and taking the document with the cursor 517 and positioning the cursor (or alternatively the inner zone/hot spot of the selected document) over the pile and particularly over the inner zone 516 of the pile shown at stage 515. After a predetermined period of time, the computer responds as shown at stage 520 with the view cone 518 and the proxy 519 within the view cone, which proxy shows the document immediately underneath the current location in the pile which the user has selected by placing the cursor 517 (or alternatively the inner zone/hot spot of the selected document) into the inner zone. If the user is satisfied with this location the user releases the selection by typically releasing the mouse button on the mouse causing the pile appear as shown at stage 525.

The invention provides a method for the user to include a user defined specification, such as a script, for a pile. A user defined specification may be provided by the user (e.g. typing keywords as a specification or selecting a sample document, having an internal representation which is described below and which provides the specification) or may be suggested by the system and ratified by the user. Normally, the user can control whether a pile has such a specification and thus the system will not create such a specification without the user's approval. Not every pile needs or will have a user defined specification, although every pile will have an internal representation (described below) or a user defined specification.

Figure 13A:
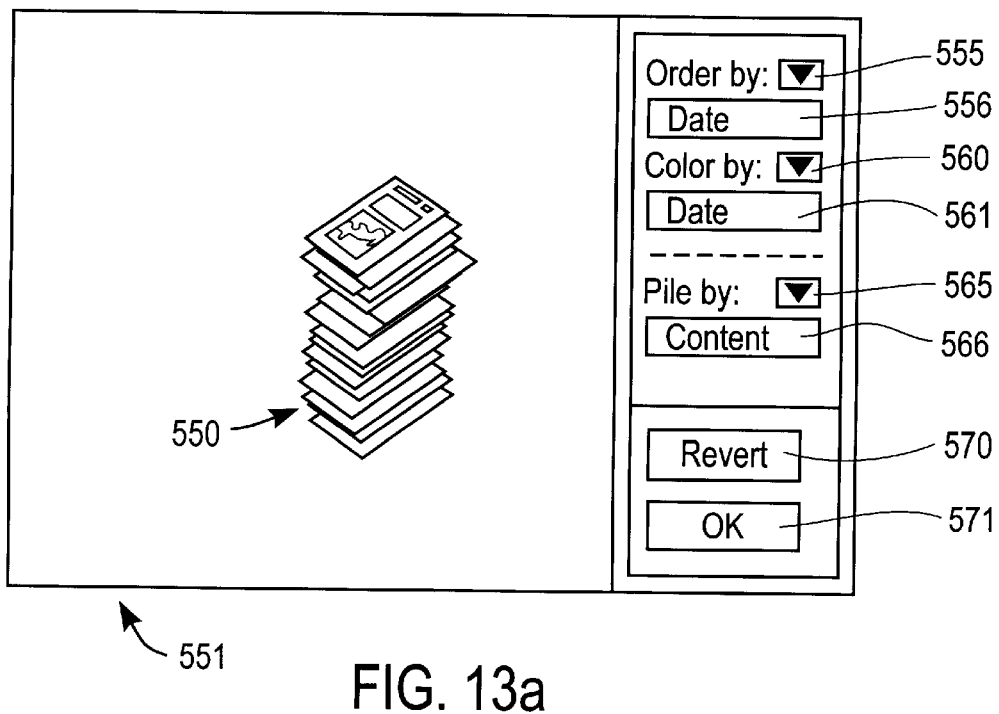
FIG. 13a shows a visualization window containing a user pile.

A tool for visualizing and organizing the contents of a pile will now be described by referring to FIG. 13a and 13b. A pile 550 is shown within the visualization window 551 of FIG. 13a. Typically, the user would select the pile 550 and then select a command from the computer which would invoke and display this visualization window with the selected pile 550 within the window 551. The window 551 includes several command options which allow the user to view the pile in different ways and to order the contents of the pile in different ways and to select between those different ways in order to obtain different appearances of the pile or to otherwise reorganize the pile (e.g. create subpiles from a single original pile). For example, by placing the cursor over the arrow icon 555 and by selecting the icon 555 by depressing the mouse button or otherwise signalling to the computer to select the arrow icon 555, the user causes the computer to display a pull down menu indicating the various ways in which the contents of the pile may be ordered. The system shows in box 556 that the pile is currently ordered by date which means either that the most recent items are on the top or the oldest items are on the top depending on the designer's preference. Other options which may be included in the "order" pull down menu (activated by selecting arrow 555) may include: ordering by content; ordering by size; ordering by author (alphabetically). The operation of the pull down menu is well known in the art and has been described for example in U.S. Pat. Reissue 32,632. The arrow icon 560 allows the user to select the way in which the pile is colored. As shown in box 561 the system currently has colored the pile by date in which, in one embodiment, the most saturated shade of a color is displayed near the bottom of the pile (indicating the older documents) then the top of the pile has a lesser saturated shade of the same color. It will be apparent to those in the art how to implement this function by assigning colors; for example picking a color in a perceptual color space (e.g. Munsell color space) and varying the saturation of the color holding the luminance constant and the hue of the color constant. The range of the dates would be used to set the outer limits of the saturation. That is, the oldest and most recent documents would form the extremes of the saturation range and a date in the middle of that range would specify a color in the middle of the saturation range.

Other ways of presenting various colors according to a measure of the date/age of the document will be appreciated by those in the art, particularly by referring to art relating to color management systems in computers. For example, the hue may be varied (e.g. from red to blue) while keeping a constant saturation and luminance. Alternatively, preselected colors (and the color values) may be used in a look-up table for mapping the measure of date/age of the document to one of the preselected colors in the look-up table.

In a similar manner, the user may desire to view the color of the pile 550 according to the content of the pile. This would be done by the user selecting the arrow icon 560 to cause a pull down menu to appear below the arrow icon 560, which pull down menu would include the command option of "coloring by content." The user would then select this command option placing the cursor over that command option and releasing the selection (e.g. by releasing the mouse button) which then causes the word "content" to appear within the box 561 indicating that the system will color the pile by content. This will be described in more detail below particularly with reference to FIG. 20.

The visualization window 551 also includes an arrow icon 565 which activates a pull down menu to allow the user to select the manner in which the pile is organized (e.g. "pile by content"). As shown in FIG. 13a, the user has selected "pile by content" which may cause the system (depending on how related all documents are within the pile 550) to create subpiles from this pile 550. The user could have selected other options available in the pull down menu from icon 565, such as, "pile by date," "pile by stamps," "pile by data type", "pile by source," etc. Let us assume that pile 550 is a pile of mail messages obtained through electronic mail which the user has moved out of a mail window such as window 61 and has selected this pile for visualization in a visualization window 551. Because it is a mail message pile, it is likely that the contents of the various documents in the pile will vary over a large range and that the pile would be better organized into several subpiles according to content. Accordingly the user has placed the pile into the visualization window 551 and desires to pile by content; that is, the user desires to make subpiles from the original pile. The user does this by selecting a command to indicate that the pile should be piled by content. In the embodiment shown in FIG. 13a, the user selects this by selecting the "arrow" button 565 which the user may do, for example, by placing the cursor over the region of the button 565 and pressing and releasing the mouse button or by otherwise signalling to the computer to make this selection. Upon making the selection, visualization window 13b appears wherein three organized piles 575, 576 and 578 are displayed along with a miscellaneous pile ("other") 577. The system has, in addition to creating the subpiles, provided a name for each pile in the manner described below, particular with reference to FIG. 15. At this point, the user may instruct the computer system to infer a user defined specification, for example, a script, from the system created subpiles which could then be used to automatically file new mail documents received over the electronic mail network into one of the subpiles according to the particular script of the subpile. The system infers the script by using the system provided internal representation of each subpile; for example, the 'N' (where N is an integer) most characteristic words in the pile's internal representation (e.g. the pile's vector described below) could be used. The user could then review the list of the 'N' (set by some system threshold value) most characteristic words and approve or disapprove of all or some of these words and then create the script. More details concerning scripts will be presented below with reference to FIG. 14.

The piles in FIG. 13b were created from the original pile 550 by allowing the system to create the subpiles as described in the manner below. In this way, the user of the computer may more efficiently review the various mail messages and other documents within the original pile rather than having to browse through the pile to see the keyword proxy of FIG. 4f or otherwise select documents from the original pile. Thus, for example, if the user is most interested in "art, design" documents, then the user may begin looking at documents in that pile first and defer examining the other subpiles or perhaps the "notebook computer" pile depending on the interests and priorities of the user. As will be described in more detail, the system analyzes each document in the original pile based on the content of the document and then determines the most appropriate subpile in which to place the document. Each subpile will have a representation of the content of the documents within the subpile and that representation will be compared against the representation provided by the system for the particular document. The closer the match between the two representations and the more likely the particular document will end up in the particular subpile.

Figure 13B:
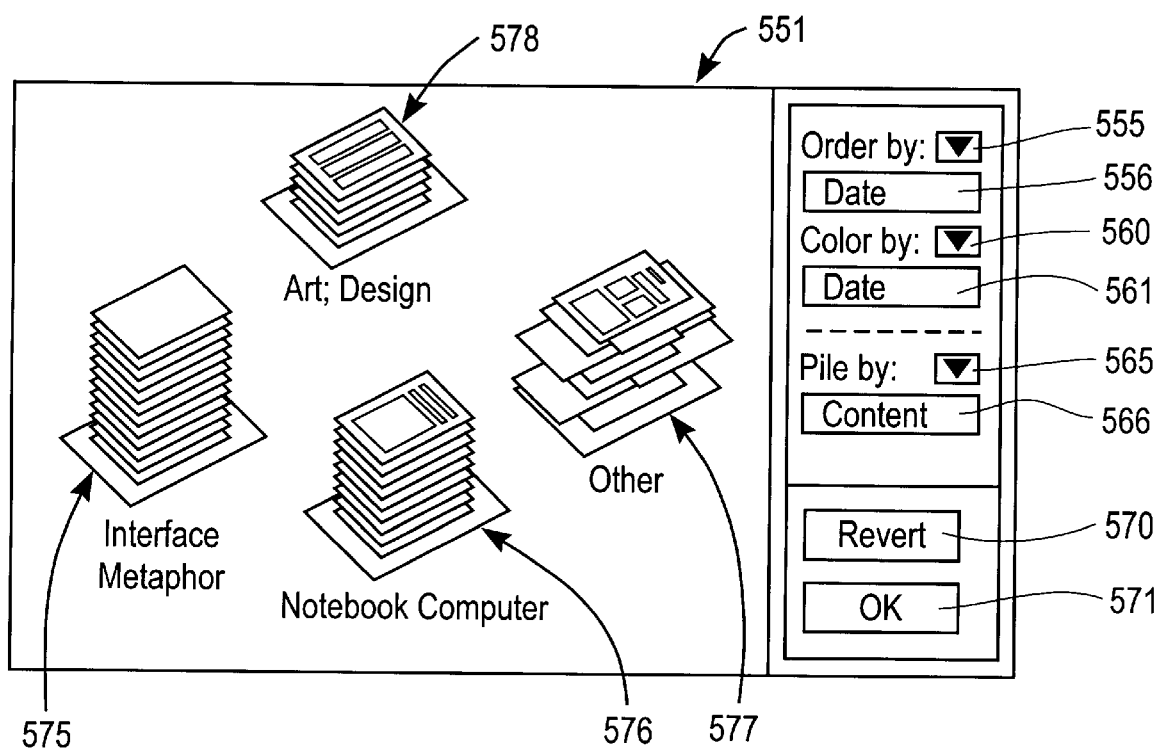
FIG. 13b shows another visualization window containing four piles.

If the user is satisfied with the results of the subpiling process shown in FIG. 13b, the user may retain this structure by selecting the "Ok" button icon 571. Otherwise, the user may cause the documents in the subpiles to be reassembled into the original pile 550 by selecting the "Revert" button icon 570. If the user selects "Ok" 581, the filing system creates a new pile for each subpile, which in one implementation involves changing the pathname of each document in each subpile in the manner described above.

Figure 14:
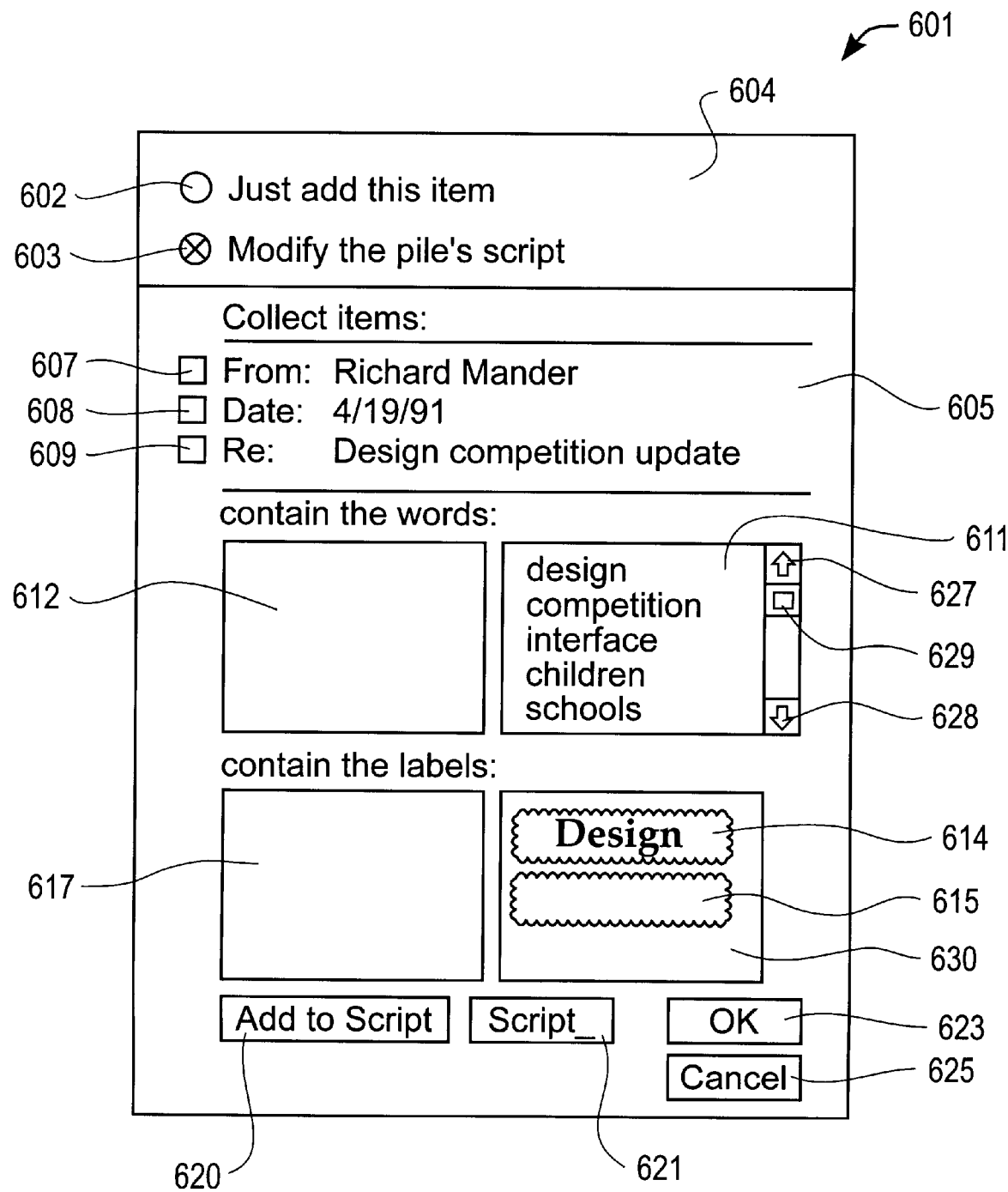
FIG. 14 shows a script/criteria control window according to the present invention.

FIG. 14 shows another tool, a script window 601, for manipulating piles which have a user defined specification (e.g. a script) and controlling the way they work in the computer system. The user may obtain the window 601 or other windows for creating and/or editing scripts in various ways, such as providing a command to the computer to display such a window on a display screen 22 (e.g. a "Create script" command) or adding a document to a pile that already contains a script where the document's content does not match the script in a close enough way and where the system has been instructed to so notify the user when this occurs. In either instance, the script window 601 appears on the display screen 22. If the window was invoked by adding an item to a pile and the user does not mind that the content of the document does not precisely match the script of the pile, the user may select the command "just add this item" by selecting this command in the various ways known to select the command in a graphical user interface. This would typically take place by positioning the cursor near the button icon 602 and selecting this command while the cursor is positioned over the button 602. If the user desired to modify the pile's script to accommodate the new document which was added then the user may select this option by placing the cursor in the button 603 and selecting that option (e.g. by depressing and releasing the mouse button while the cursor is held over button 603). As shown in FIG. 14, the user has selected the option of modifying the pile's script.

The script window 601 as shown in FIG. 14 has appeared after the user attempted to add a text document from Richard Mander (dated Apr. 19, 1991 and regarding design competition update) to a pile having a script. Since the document's representation did not match in a close enough manner the criteria of the pile's script, the computer displayed the window 601. The script of the pile to which the Richard Mander document was added can now be modified by selecting various options within the script window 601. The region 605 of window 601 contains three check boxes 607, 608 and 609. If the user selects any of these three check boxes this will instruct the system to modify the script to cause the system to collect into the pile items "from Richard Mander" or items "dated Apr. 19, 1991" or items "regarding design competition update", depending on which option or options are selected by the user. For example, if the user selects the option to collect items "from Richard Mander" then the computer system searches the filing system for documents containing a "from" line or field indicating that Richard Mander is the author of the document or an author of the document. Similarly, if the user selects the option of collecting items which are dated Apr. 19, 1991, the system will collect documents which are dated Apr. 19, 1991 into the pile which is controlled by this script. Typically, the user will select any of these options by manipulating the cursor control means to position the cursor over one of the check boxes and then by selecting the check box, which may occur by depressing and releasing the mouse's button. Thus, for example, if the user wanted to pull all documents into the pile which have a regarding line "design competition update" then the user would position the cursor over the check box 609 and select that option by depressing and releasing the mouse button. This causes the system (after the user selects the command) to pull in all documents into the pile controlled by this script which contain "design competition update" in the regarding line/field of the document. In this manner, the system may automatically classify information for the user and the user may instruct each pile separately according to the needs and criteria of the user or the basis of a user defined specification.

Region 611 of the script window 601 contains a list provided by the system which indicates the most unique used words in the particular document from Richard Mander (i.e. the document which was added to the pile and then caused the system to display the script window 601 on the display screen 22). As will be described below, the system can provide a ranked list of the most frequently used words in a document which also best characterize the document relative to all other documents in the file system of the computer. This is done by the use of, in one implementation, the vector described below for the document. In this implementation, each word listed in region 611 is one component of an n dimensional vector which describes the document and provides a representation of the contents of the document. As shown in script window 601, the word "design" is the most characteristic word followed by "competition" and "interface". The system provides this listing in region 611 and the user may scroll through the various words in this listing by selecting the scroll arrows 627 and 628 or by using the scroll bar 629. The scrolling of the contents of region 611 is accomplished in the normal manner of the prior art. The user may select any one or all or some of the words in region 611. When these words are selected, they appear in region 612 indicating to the system that the pile's script should be modified such that the representation of the pile (e.g. the pile's vector), as described below, is modified to take into account the words selected by the user. Alternatively, the user may type words into region 612 to thereby modify the script of the pile. In this manner, the script of the pile is modified to take into account the new document from Richard Mander which was added to the pile by the user before the script window 601 was displayed. For example, the user could select "competition" and the word "children" and these words would then appear in region 612; when the user selects "add to script" button 620 this causes the system to update the script for the pile causing the internal representation of the pile to be modified in order to allow the user to control the way the script behaves in the computer system. The selection of the words in region 611 may be accomplished in any of a number ways which are familiar to users of computer systems having graphical user interfaces (e.g. positioning the cursor over a word and selecting the word or "shift-clicking" to select multiple words).

In a similar manner, the script of the pile may be modified to take into account labels which specify certain criteria such as label 614 shown in region 630. These labels contain certain "canned" criteria specified by the user and the user may select these labels by positioning the cursor over the particular label and selecting the label causing the icon of that label to appear in region 617. These labels may be the programmable user interface elements described in the application having Ser. No. 07/700,729 now U.S. Pat. No. 5,202,828, which was filed May 15, 1991 and is entitled "A User Interface System Having Programmable User Interface Elements" and is assigned to the assignee of this application. These labels provide a programmable means for causing the execution of a series of instructions and may include, for example, a requirement that all documents in a pile be dated after a certain date.

Once the user has determined and selected the various criteria which are to be used to modify the internal description of the pile (pile's script) then the user may indicate to the system that the script should be modified by selecting the "add to script" button 620 and then by selecting the okay button 623 which causes the execution of the script wherein the system checks for documents managed by the filing system which match the modified script. If the user does not like certain criteria which have been previously selected, the user may cancel the selection by selecting the cancel button 625. If the user selects the "script . . . " button 621 the system provides a window for the user to type in words or other criteria which will then be used to modify the script of the pile. This modified script may then be selected by selecting the add to script button 620 and okay button 623. If the user has requested a script window similar to window 601 while not adding to a pile, then the user desires to modify the script of the pile; this is accomplished by entering commands into a script window in a manner similar to that described for window 601.

The manner in which the filing system of the computer takes into account the representation of each document and each pile and performs the various operations with piles which have been described above, will now be described by referring to the various flow charts of FIGS. 15 through 21.

Figure 15:
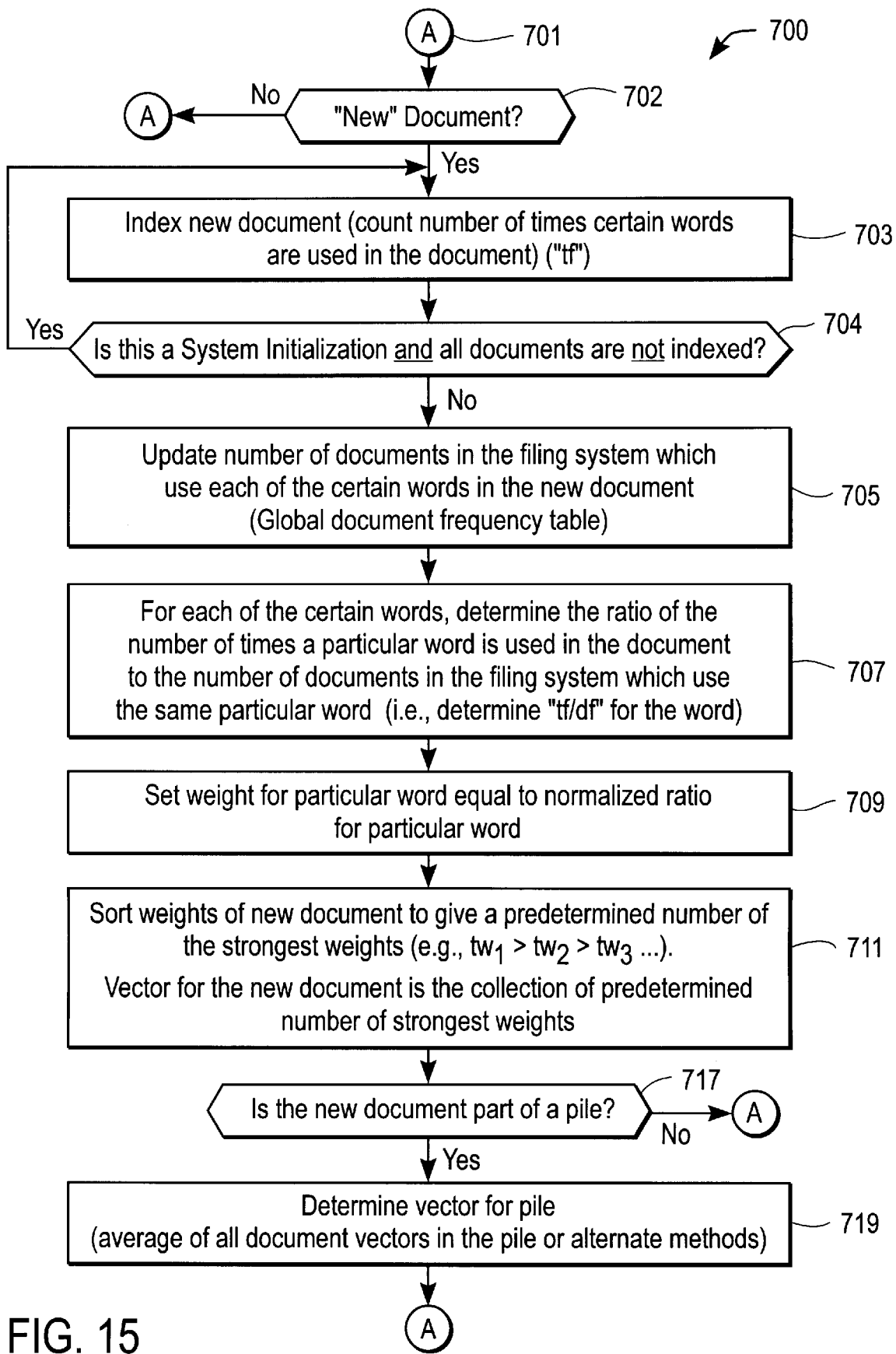
FIG. 15 shows a flowchart for indexing documents according to the method and apparatus of the present invention.

FIG. 15 shows one method according to the present invention for creating the internal representation used by the filing system in organizing piles, which internal representation is for each document in the filing system (or for a certain selected group of documents as specified by the user) and for every pile maintained in the filing system (or for piles which have been selected by the user to have their internal representation determined). Typically, the filing system will perform this operation for every document (usually user documents, not system documents such as operating system files) and for every pile in the system. If the filing system is using the method of the invention for the first time, then the method shown in FIG. 15 must be applied to every document in the system; that is, every document in the system must be treated as a new document. The method 700 for indexing documents begins at step 701 which is merely a node point in the process. The first operational step of the system involves a test for whether the document is a new document at step 702. A modified document is considered a new document as well as a new document which the user creates or which comes into the users computer system via electronic mail. It is also noted that a document that is deleted affects the internal representation of all other documents in the system and the designer of systems using the present invention may want to eventually (e.g. in background processing on the computer system) recompute each document's vector and each pile's vector in this circumstance also. If there is a new document in the computer system processing proceeds to step 703 in which the computer system counts the number of times certain words are used in a document. Only certain words are counted because many words (e.g. the, it, a, and, etc.) are used too commonly and would not provide a good internal representation of the contents of any document. Therefore, these words (referred to as "stop words") are discarded in analyzing and indexing documents. This may be accomplished by the system establishing a "stop word" table which is examined for each word in a document which is being indexed. The system should also "stem" each word being indexed in order to prevent unnecessary redundancies between the singular and plural of a word (e.g. "horse" and "horses") and different tenses of a verb and other techniques which are known in the art may be applied for stemming the words (e.g. child and children would be considered the same word). During indexing of each document, the system adds a new (non-stop) word to a table of unique words for the document or if the word is already in the document's table the system increments the count component for that word in that table. It will understood that this table will be maintained for a document during indexing and the table contains an index to each non-stop word in the document along with a count of the number of times the word appears in the document. The index typically refers to (indexes) a global document frequency table which contains a list of all non-stop words used in all documents managed by the filing system of the present invention. Also during indexing a document in step 703, the global document frequency table is updated in the following manner. That is, step 705 is typically performed at the same time as step 703 although it need not be. For each unique word in a document the system adds the word or increments the count for the word in the global document frequency table but only for the first time the unique word is found in the document. This global document frequency table is maintained for all documents in the system which are to be indexed and shows the number of documents in the system which use the particular word. If during indexing a unique (non-stop word) is found which is not in the global document frequency table then the word is added to that table but only for the first time the word is found in the document. That is, subsequent uses of that word in the same document will not cause a modification of the global document frequency table. If that same word is found in another document then, during indexing of that other document, the system increments the count for that word in the global document frequency table, thereby indicating that the word is contained in two documents.

After indexing a new document, step 703, processing proceeds to determining the number of documents in the system (documents which are previously indexed) which use each of the certain words in the new document. This is determined by examining the global document frequency table, which may be a hash table, for each word in the document which has been indexed. If all documents are new in the system, a special initialization process which is accomplished in two phases must be performed in order to properly index all documents in the system. In the first phase, word frequencies are computed for all the documents; in other words, step 703 is performed for each document in a system and then the global document frequency count table will then be completed. In the second phase the document vectors are calculated, which is shown as step 707, for each document in a system. Step 704 performs, in effect, this two phase initialization process by forcing step 703 to be repeated when system initialization occurs; step 703 is repeated until all documents are indexed and then the global document frequency table is completed. System initialization may be determined by searching for the global document frequency table; if it exists when a new document is indexed in step 703 then the system has been initialized and otherwise the system has not been initialized and initialization proceeds until all documents are indexed in step 703.

In step 707 the internal non-normalized representation of a document is determined by calculating the document's vector. This is done by determining, for each of the non-stop words in the document the ratio of the number of times the particular word in the document is used ("tf"—obtained from the document's table) divided by the number of documents in the system with the same particular word ("df"—obtained from the global document frequency table). This ratio is sometimes referred to as the term frequency (tf) of the word divided by the document frequency df of the word (tf/df). This ratio provides a weight for the particular word for this document as shown in step 709. Typically these individual weights are normalized in the manner shown below. Then the system will typically sort, in step 711, the normalized weights of a particular document to select a predetermined number of strongest normalized weights. The vector for the document is the collection of the predetermined number of strongest normalized weights. In a typical embodiment, 50 to perhaps an unlimited number of the strongest weights (which represent 50 to an unlimited number of the most characteristics words of the document) would be used for the document's vector. If an unlimited number of weights is used, the system will tend to operate slower. At this point, the system has the information necessary to display the proxy shown in FIG. 4$f$ (used in the case of mail documents) because the most strongest weights identify the most characteristic words in the document, and it is these words which are displayed in this proxy (together with, if desired, words in preselected fields of a document, such as "To", etc.). At step 717, the system determines whether the new document is part of a pile. If it is not processing loops back to node A (701) which is a waiting node in which the system waits for a new document in the filing system of the computer. If the new document is part of a pile then processing proceeds to step 719 in which the internal representation (e.g. a vector) for the pile is determined. This representation may be any one of several possible types, including the average of all document vectors in the pile (which is representative of the internal context of the pile) or the pile's representation may be designated by a script as described above or designated by a sample document (i.e. the pile's vector is the same as a sample document's vector) or the pile's vector may be designated by certain key words having user established weights. It will be appreciated that if the method 700 for indexing a document is being performed during initialization of the system then the determination of a pile vector will occur after all documents have been indexed and the global document frequency table has been completed. After step 719, processing loops back to node A wherein the system waits for an interrupt or other messages indicating a new document has been placed into the filing system of the computer.

The methods employed in steps 703, 705, 707, 709 and 711 are known in the art and various ways of determining an internal (or content) representation of a document are available in the information retrieval art. See, e.g. "Term-Weighting Approaches in Automatic Text Retrieval," G. Salton and C. Buckley, *Information Processing & Management,* Vol. 24, No. 5, pp. 513–523, 1988. However, these methods have not been used in the context of piles as described in this invention. In one implementation of the invention, the normalized weight for a particular word ("tw$_1$") in a particular document is determined according to the formula:

$$tw_1 = \frac{tf_1\left(\log\frac{N}{n_1}\right)}{\sqrt{\sum_{i=1}^{a}\left(tf_i\left(\log\frac{N}{n_i}\right)\right)^2}}$$

where: $N$ = total number of documents in the filing system which are selected for indexing (default selection is all user documents);

$n_i$ = $df$ for the word "$i$" ($df$ is document frequency for word "$i$" from the global document frequency table)

$tf_i$ = term frequency for the "$i$th" non-stop word in the particular document $a$ = number of unique non-stop words in the particular document (i.e. the number of components in the vector for the particular document)

$n_1$ = the $df$ for the particular word having its normalized weight being determined $tf_1$ = $tf$ (term frequency) of the particular word in the particular document; $tw1$ is the normalized weight for this particular word in this particular document Other implementations may be used according to the needs of the system designer.

Figure 16:
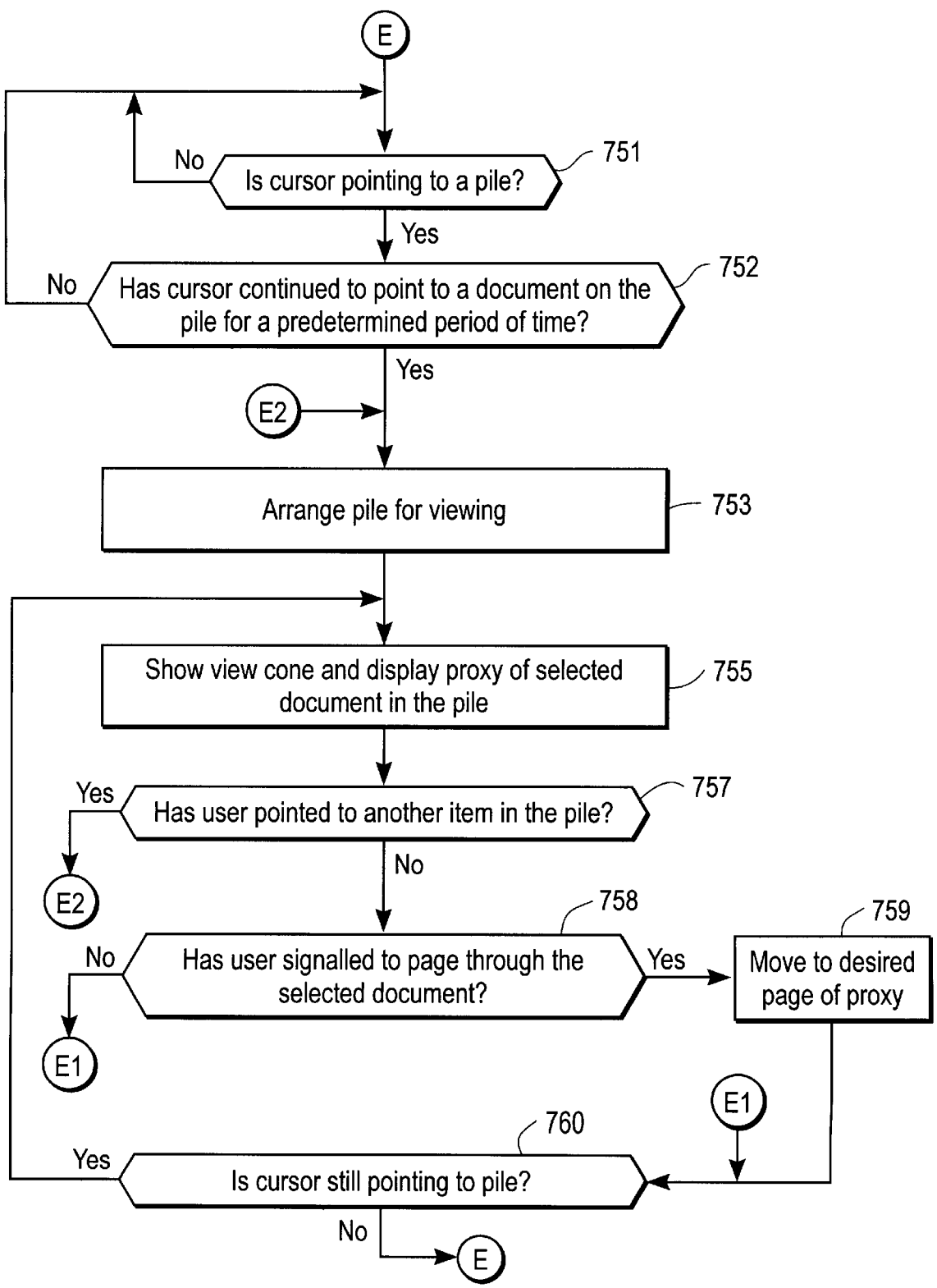
FIG. 16 shows a method for browsing a pile and displaying proxies of documents within the pile.

FIG. 16 shows a method for performing the operation of browsing of a pile. From node E, the system begins at step 751, in which the system examines the location of the cursor and determines whether or not it is pointing to a pile. It will be appreciated that the system will typically monitor the position of the cursor in any one of the many ways known to those in the art. If the cursor is not pointing to the pile processing loops back to node E. If the cursor is pointing to a pile then processing proceeds to step 752 in which the computer determines whether the cursor has continued to point to a document on the pile for a predetermined period of time. If not (e.g. cursor moved away from pile) processing loops back to node E in which the system continues to monitor the position of the cursor. If the cursor has pointed to a document on a pile for a predetermined period of time then processing proceeds to step 753 in which the system arranges the pile for viewing. This step may involve nothing or it may involve shifting a portion of the pile as shown in FIG. 4e. Processing then proceeds to step 755 in which the view cone is shown and a proxy of the selected document in the pile is displayed. Then the system continues to monitor the position of the cursor to determine whether the user has pointed to another item in the pile (step 757). If this is true, processing loops back to step 753 to arrange the pile for viewing (e.g. pile is re-arranged to reflect a new shifted portion) and processing continues to step 755 in which the view cone continues to be displayed and a new proxy of the new selected document is also displayed in the view cone. If the same document is still being displayed because the pointer has not moved away from the document processing proceeds from step 757 to step 758 in which the computer determines whether or not the user has signalled to the computer to page through the selected proxy to the extent the proxy has multiple pages. If not, then processing goes to step 760; otherwise processing proceeds to step 759 in which the system shows the desired page of the multiple page proxy in the view cone on the display screen 22. Since the computer continues to monitor the position of the cursor and the status of the mouse's button, the computer system continues to determine whether the cursor is pointing to the pile (step 760); if not processing loops back to node E and otherwise processing loops back to step 755.

Figure 17:
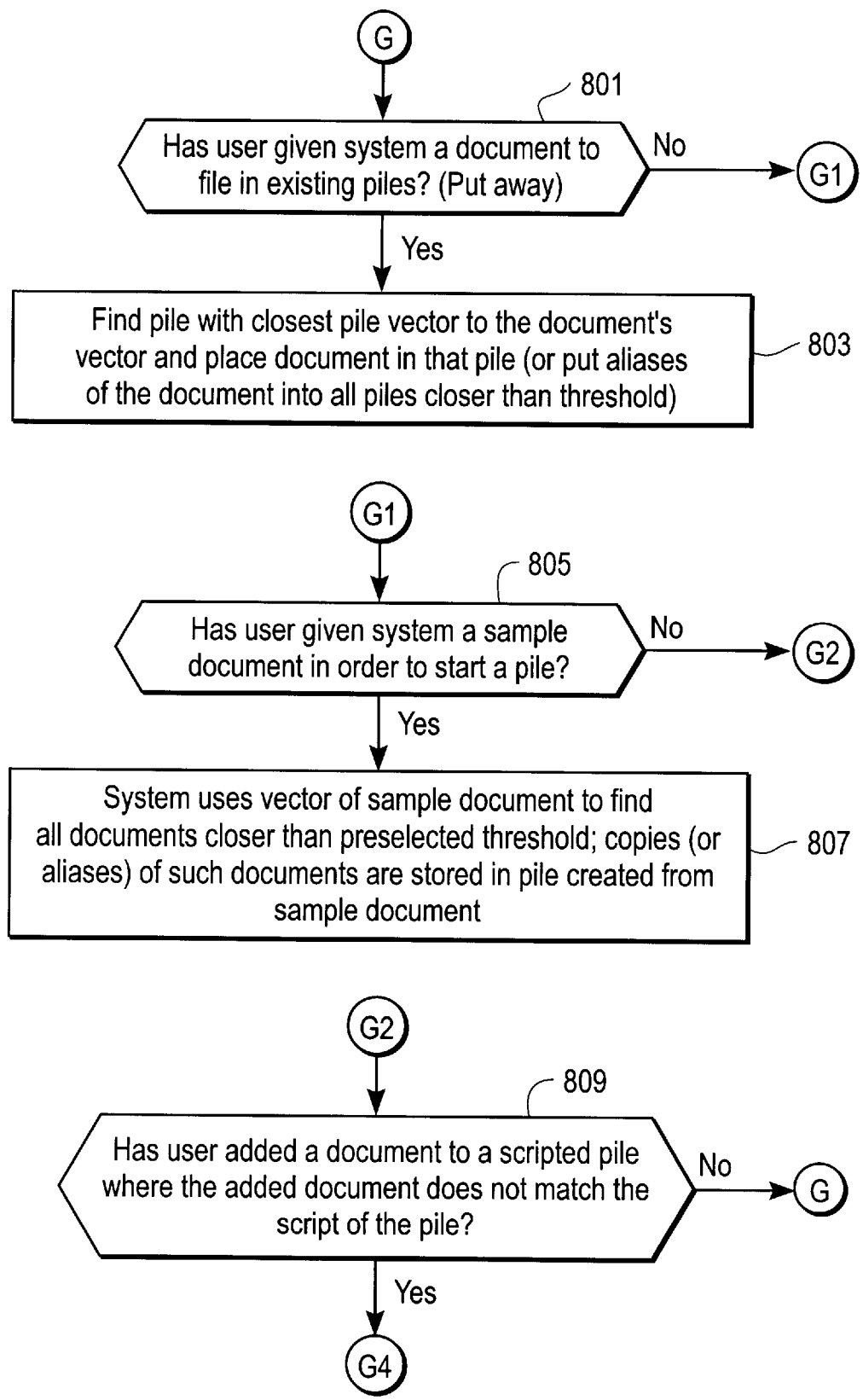
FIG. 17 shows a method for allowing the system to control the filing of items within piles.
Figure 17:
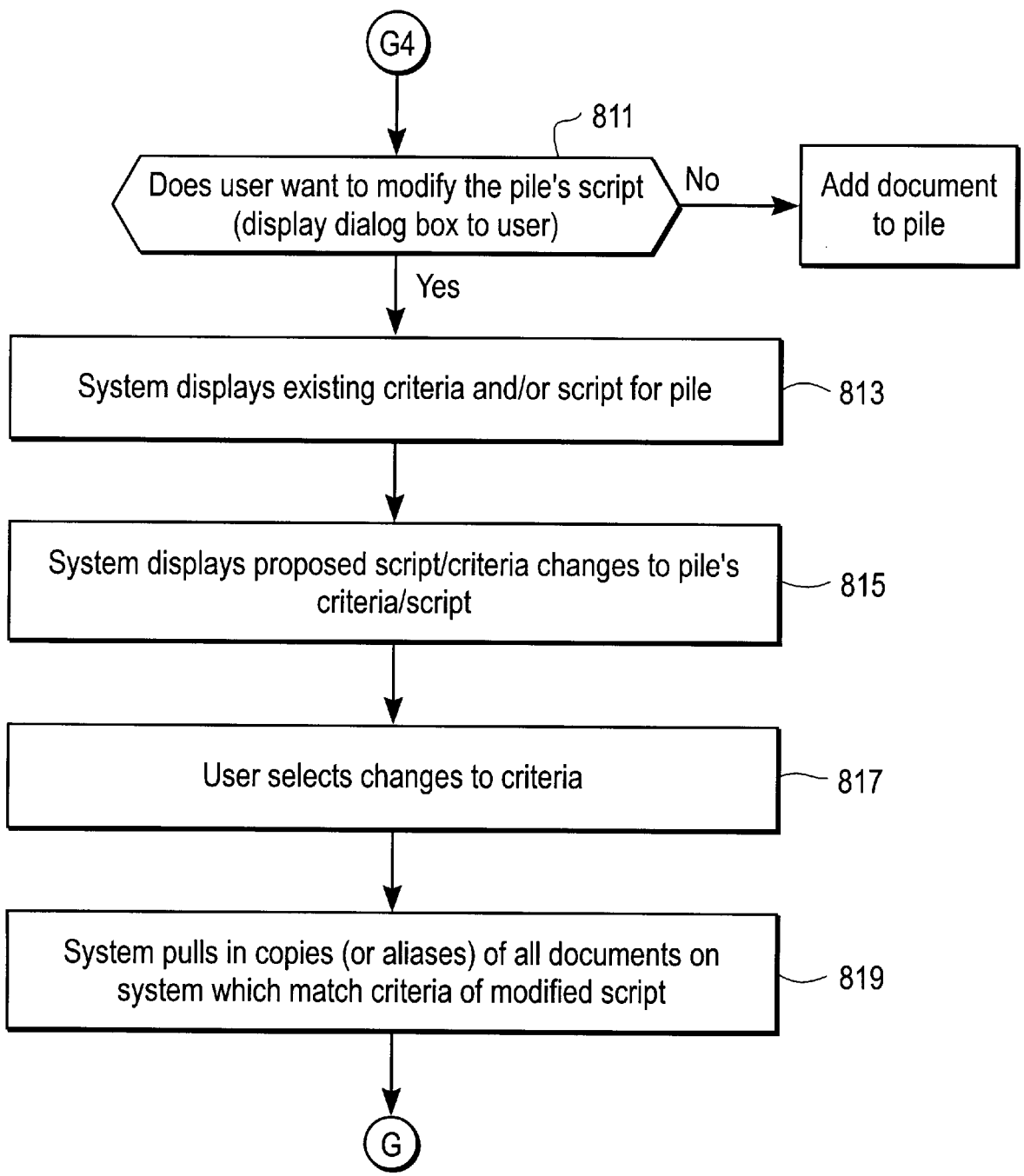

As noted above, the system provides various automatic or user invoked actions on piles in order to assist the user in organizing the documents stored stored in the user's filing system on the computer. The various ways in which the system of the present invention performs these functions will now be described with reference to FIG. 17. FIG. 17 shows three distinct processing flows from three nodes (G, G1 and G2). It will appreciated by those in the art that any of these nodes may be entered into on the basis of an interrupt provided to the system or some other user action so that entry may occur into the flow chart of FIG. 17 at any node point, such as node point G, G1, or G2 depending on the action by the user. Processing begins from node G at step 801 which determines whether or not the user has given a document to the system to file in existing piles. This may occur by the user providing a "put away" instruction to the filing system after selecting a document to be put away. If this occurs, then processing proceeds to step 803 in which the system attempts to find a pile with the closest pile vector to the document's vector and places that document in that pile. This is typically done in such a manner that the similarity between the content of the document and content of each pile is determined. In a typical embodiment this similarity is determined by computing the unit dot product of the pile's vector and the document's vector. A system or user supplied predetermine threshold may then be used to compare against each dot product and the highest dot product above the threshold will indicate which pile to place the document into. Alternatively, the document (copies thereof) or aliases (pointers) thereof may be placed into all piles which produce dot products with the document's vector which exceed the preselected threshold. It should be noted that step 803 could be performed automatically by the system for any new or modified document if the user so instructs the computer system to perform this function automatically. That is, the user may instruct the filing system on the computer to always be active in putting away documents into piles rather than doing this only when specifically invoked by the user (e.g. a "put away" command). An example of a method for determining a measure of similarity will now be provided. Consider a document vector and a pile vector shown below:

| Document Vector | | Pile Vector | |
| --- | --- | --- | --- |
| index | tw | index | tw |
| 5 | 0.1 | 5 | 0.2 |
| 27 | 0.2 | 16 | 0.17 |
| 503 | 0.15 | 257 | 0.17 |
| 600 | — | — | — |
| — | — | — | — |
| — | — | — | — |

Each index may be a pointer/index to an entry to the global document frequency table where the index "5" is for one word in the table and index "27 is for another word in that table. Note that in this example there is only one word (non-stop word) which is common between the document's vector and the pile's vector. The dot product, which is a way to measure the similarity between the content of the document and the content of the pile, for this example is determined by searching for matches in the indexes (e.g. index 5) and multiplying the tw's for each matched index. In this case, the dot product is: 0.1×0.2=0.02 since there is only one match. This dot product may then be compared to other dot products showing the similarity between the document and other piles.

Step 805 is performed any time after entry from node g1. In step 805, the system determines whether or not the user has given the system a sample document which should be used in order to start a pile. If not, processing proceeds to node g2. If the system has been given a sample document and been instructed by the user to start a pile on the basis of that "seed" document, processing proceeds to step 807 in which the system uses the vector of the sample document to find all documents which are closer than the preselected threshold based on the internal representation of each document, such as the document's vector. Copies or aliases of such documents are stored in the pile which was created from the sample document.

Step 809 may occur from an interrupt to the system or a command to the system; this interrupt may occur from the action of adding a document to the pile when the user has instructed the system to monitor the addition of documents to a pile having a script where the internal representation of the document does not match the criteria of the script of the pile. As an alternate embodiment, the user may instruct the computer to observe the "cohesion" of each pile (whether or not the pile has a script) and indicate a warning to the user that a newly added document to a pile does not match in a close enough manner (determined by a similarity measurement being compared to a preselected threshold), which warning gives the user an opportunity to remove the document from the pile. It is noted that the user could actually instruct the computer to ignore any such steps which in effect results in an automatic "no" to the decision made at step 811. If the user has instructed the filing system to monitor the addition of documents to a pile having a script, then step 809 will be invoked when the user adds a document to such a pile which does not match the document. In other words, the script of the pile does not closely match the internal representation of the document. If this occurs processing proceeds to step 811 in which the system displays a dialog box or window to the user asking the user whether the pile's script should be modified. This dialog box or window may be similar to the window 601 shown in FIG. 14. If the user indicates that the pile's script is to be modified, processing proceeds to step 813 in which the system displays existing criteria and/or the script for the pile. Alternatively, the script and criteria could be displayed in step 811 with a decision box requiring the user to decide whether or not to just add the document to the pile or modify the pile's script. At step 815, the system displays proposed script/criteria changes to the pile's criteria or script. This is shown in FIG. 14 by the words found in the Richard Mander document which are shown in the region 611 or by the items in region 605 such as the author of the document (from "Richard Mander"). In step 817, the user selects changes to the criteria and indicates to the computer that these changes are acceptable. This causes the system to respond in step 819 by pulling in copies or aliases of all documents on the system having vectors which match the new pile's script vector. After step 819, the system proceeds back to monitoring any of the various actions/interrupts which cause entry into the processing shown in FIG. 17. The use of a script has many possibilities, for example, it is noted that the script could include the use of the vector representation of the pile as well as other features which may be matched in a boolean "AND" fashion or matched in a boolean "OR" fashion.

Figure 18A:
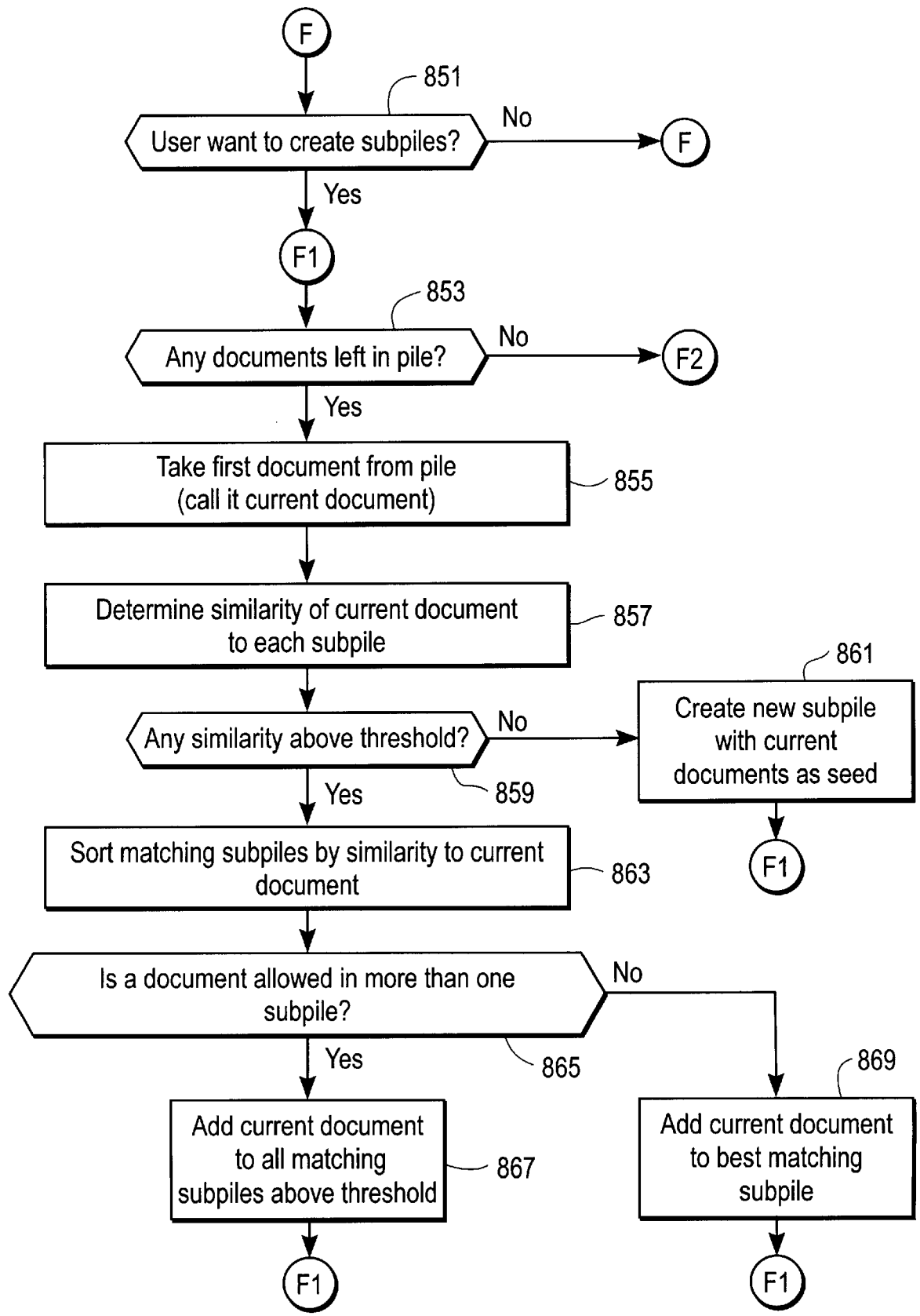
FIG. 18a shows a flowchart for the creation of subpiles by the computer system of the present invention.
Figure 18A:
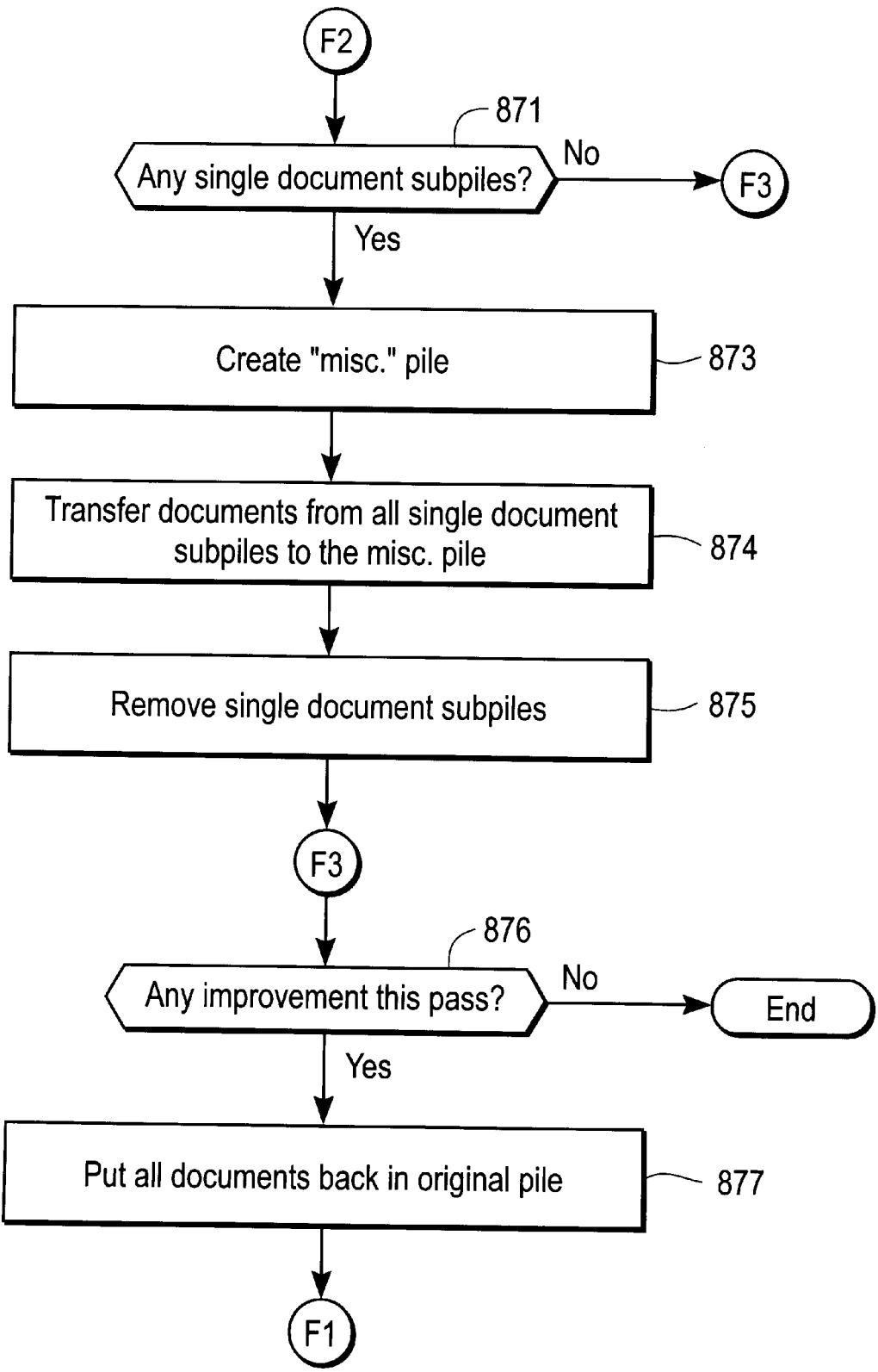

FIG. 18*a* shows a method of the present invention for creating subpiles from a pile or other selected set of documents (e.g. documents within a folder). This method would be invoked in various ways by the user or perhaps under system control automatically (e.g. as a result of a search where the user requests the search results pile to be processed into subpiles after the search). For example, the user could place a pile such as pile 550 into the visualization window 551 shown in FIG. 13*a* and then select the command pile by content causing the system to respond, as shown in FIG. 13*b* with four subpiles created by the system. If the system determines, in step 851, that the user wants to create subpiles from a pile, then processing proceeds to step 853 in which the system determines whether there are any documents which are left in the original pile. If no documents are left in the pile processing proceeds through node F2 to step 871. In the beginning of a subpiling process, typically documents will be remaining in the pile and thus processing proceeds to step 855 in which the first document is taken from the pile and is designated as the current document. Then processing proceeds to step 857 in which the system compares the similarity of the current document to each existing subpile. This can be done in many different ways as described above, including the calculation of the dot product between the vector of the document and each subpile's vector. The similarity measure, which may be the dot product described above, is compared to a threshold which may be established by the system or by the user. For example, the user may be presented with a graphical slider, the knob of which may be selected and moved along the slide to vary the threshold which will then vary the amount of subpiles which are created by the system during the process of subpiling. In the case of the first document from a pile, this test in step 859 will result automatically in the creation of a new subpile since there are no existing subpiles. After the first document in the pile, the test in step 859 will determine whether a new subpile is created, which occurs in step 861. In step 861, the new subpile is created with the current document as the seed document of the new subpile which thereby determines the internal representation of the subpile. If processing proceeded through step 861, then it loops back to step 853 as shown in FIG. 18*a*.

If the result of the test in step 859 is a "yes" then processing proceeds to step 863, in which the system sorts the matching subpiles (i.e. subpiles producing a similarity measure with the document which exceed the threshold) by similarity measurement to the current document. Then in step 865, the system determines whether a document is allowed to be in more than one subpile. If not, processing proceeds to step 869 in which the current document is added to best matching (on the basis of a similarity measure) subpile. Also in step 869, the system updates the running similarity score by adding the similarity score, which may be the dot product between the document's vector and the best matching subpile's vector, to the running total of the similarity score for the entire subpiling system, which is initialized at zero prior to beginning the process shown in FIG. 18*a*. If a current document is allowed to be in more than one subpile, then processing proceeds to step 867 in which the current document is added to all matching subpiles having a similarity measurement which exceeded the threshold. As in step 869, the running similarity score for the system is updated by adding the dot products or other similarity scores (one for each matching subpile to which the current document was added) to the running total for the system. Following step 867 or 869, processing loops back to node F1 and the various steps described above. It is noted that if the document is to be added to more than one subpile, either a copy of the document or an aliases/pointer to a copy of the document may be stored in the subpile, in a manner which is similar to the conventional prior art technique of storing a file or an aliases/pointer of a file in a subdirectory or folder.

If at any step of the process of creating a subpile, there are no documents left in the original pile, then the decision required in step 853 results in the system proceeding to step 871 in which the system determines whether there are any subpiles which contain only a single document. If no such subpile exists then processing proceeds to node F3 which results in step 876 being performed, otherwise, processing proceeds from step 871 to step 873 in which a miscellaneous subpile is created. Then, in step 874, each document from a single document subpile is transferred to the miscellaneous pile (and the running similarity score is updated) and the single document subpiles are removed from the system in step 875. Then, in step 876, the system determines whether any improvement to the total system similarity score has occurred since the last total similarity score. This system similarity score is computed as described above in steps 867 and 869 each time a document is added to a matching subpile and after all documents have been removed from the original pile this test in step 867 is typically performed; obviously, in the first pass through this step, the system will place all documents back in the original pile by proceeding to step 877 and then back to node F1, repeating the process while maintaining in storage a record of the prior total similarity score. It will be appreciated that this total similarity score is only for documents in the original pile and only for similarity measurements between those documents and subpiles created during the subpiling process described here. The test in step 876 may include a comparison to a threshold where the difference, which should be an improvement, between the prior total system similarity score and the current total system similarity score is compared to a threshold and if that difference does not exceed the threshold, then no effective improvement has occurred and processing is completed. A designer of a system using the present invention may decide that it is efficient and reasonably accurate to merely repeat the process of subpiling only once or some fixed number of times rather than attempting to access an improvement at the end of each subpiling pass.

Figure 18B:
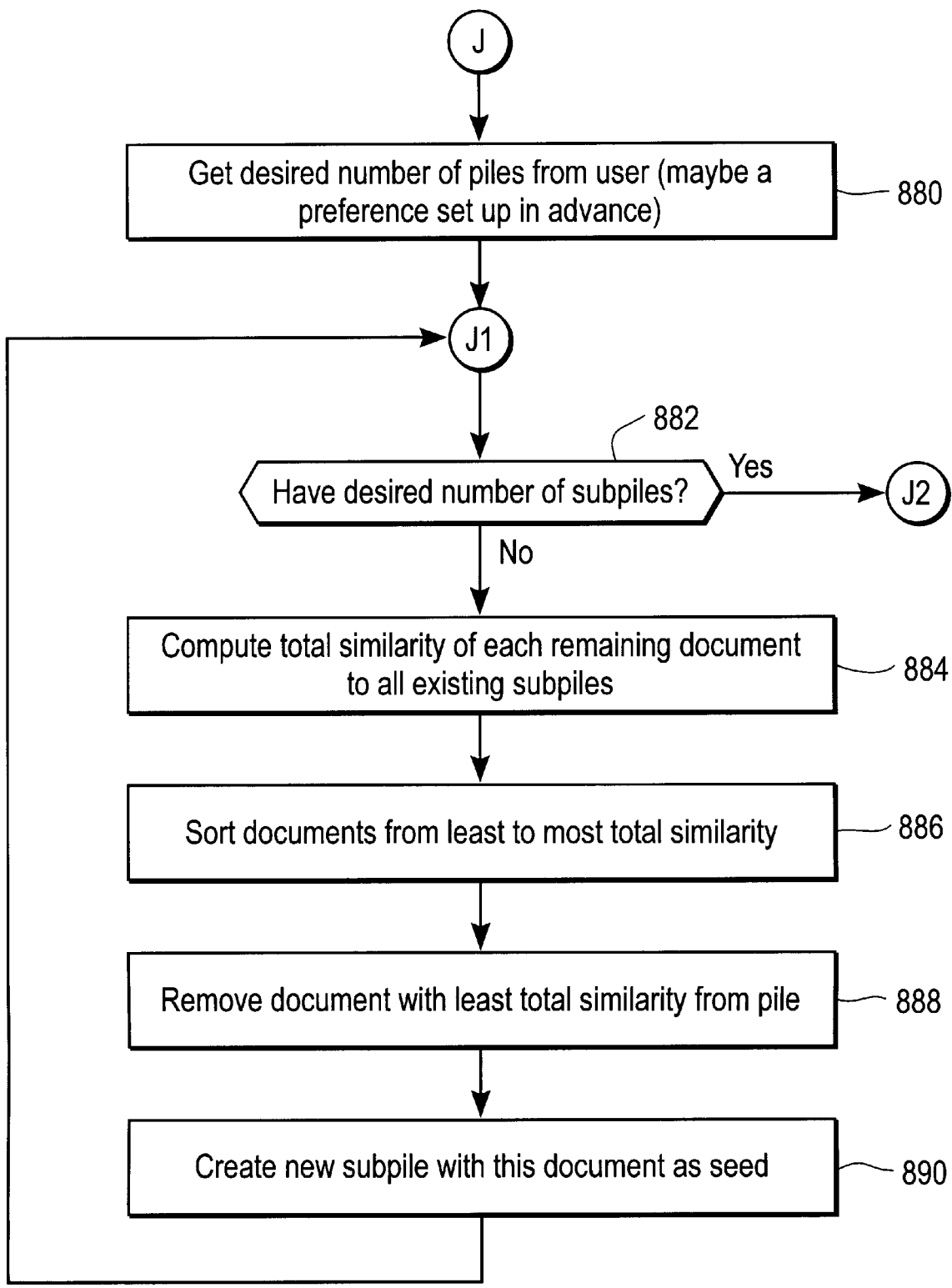
FIG. 18b shows a flowchart for the creation of subpiles where the number of subpiles has been restricted by said user.
Figure 18B:
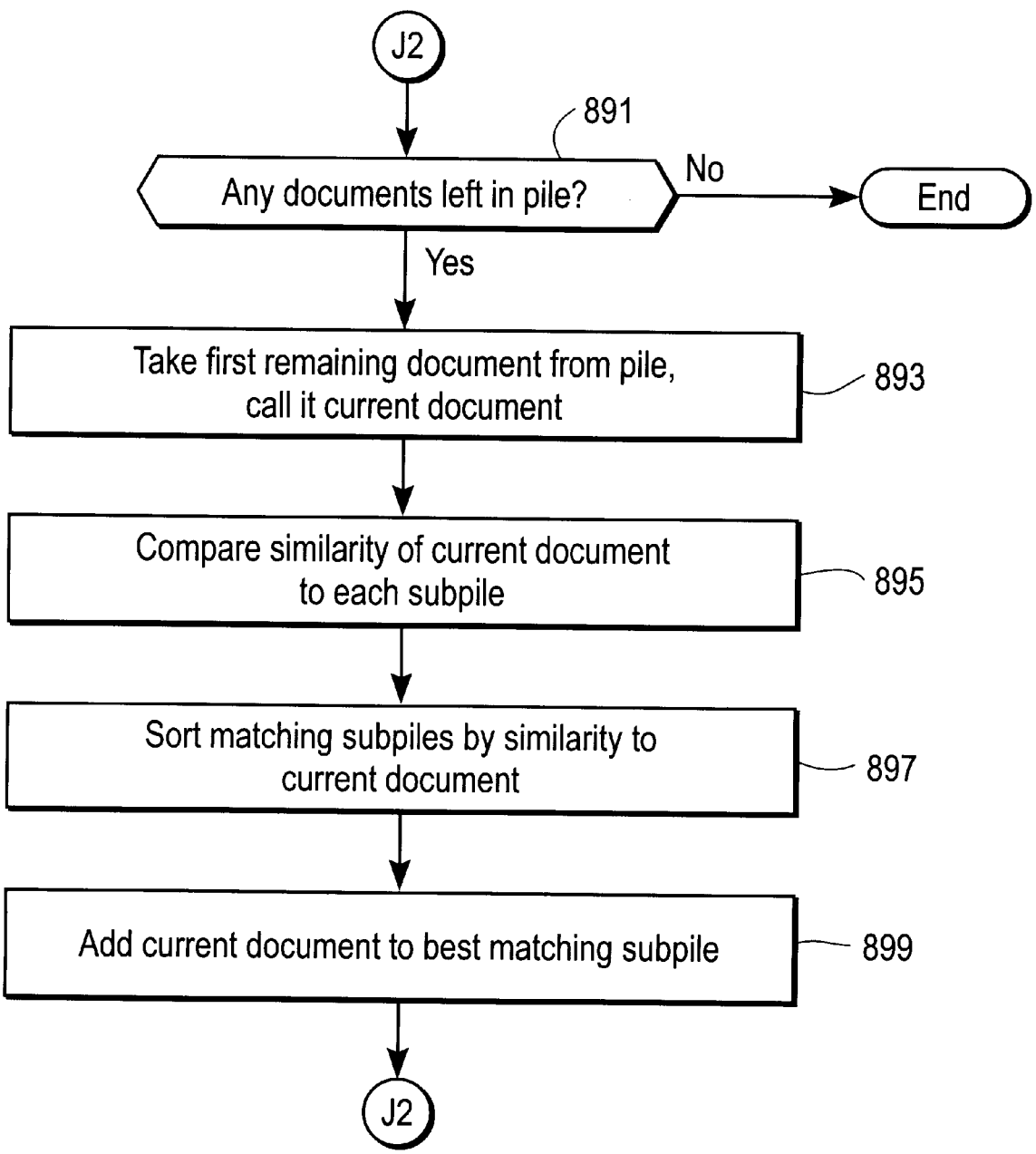

FIG. 18*b* shows an alternative subpiling process according to the present invention where the user chooses the number of subpiles which are to be created from the original pile. This is typically done in order to avoid unnecessary clutter of subpiles. Without this feature, it is possible that the computer filing system of the present invention could create too many subpiles making it more difficult for the user to manage and organize the piles created in this manner. The process of FIG. 18*b* beings at step 880 in which the system determines the number of subpiles which are allowed by the user when a subpiling process is invoked. Processing then proceeds to step 882 to determine whether the desired number of subpiles have been created so far in the subpiling process. If they have, processing proceeds through node J2 to step 891, and otherwise processing proceeds to step 884 in which the system computes the total similarity of each remaining document in the original pile to all existing subpiles. In the special case of the first document which is removed from the original pile, there is nothing to compute since no subpile exists. Then, in step 886 the remaining documents are sorted from least to most total similarity. Then in step 888, the document in the original pile with the least total similarity is removed from the original pile. In the case of the first document which is removed from the original pile, any document will do. Then, in step 890 a new subpile is created with the document which was removed in step 888, using that document as the seed for the similarity measurement comparisons (e.g. the document's vector is used for the subpile's vector). Then processing proceeds back to step 882 in which this process repeats through steps 884 through 890 unless processing proceeds through node J2 to step 891. In the second pass through steps 884 through 890, step 884 does involve the computation of the total similarity of each remaining document in the original pile to all existing subpiles. This is done in the fashion described above wherein the internal representation of each document is used with the internal representation of each subpile to compute a similarity measurement between the document and each subpile. The total similarity for a document to all existing subpiles is a summation of each similarity measurement between the document and all existing subpiles. Thus, for example, if four subpiles exist when the computation is made, four dot products may be computed as the similarity measurement, each dot product being between the document's vector and the seed vector of the four existing subpiles; these four dot products are then added together to provide a total similarity measurement for the document. Then in step 886, these total similarity measurements for each document are sorted. The document with the least total similarity in this sorted list is removed from the pile in step 888 and a new subpile is created with this document as a seed as shown in step 890 and the processing continues back to step 882. When the number of subpiles which exist by virtue of the subpiling process equals the desired number selected by the user, processing proceeds to step 891 which determines whether there are any documents left in the original pile. If the answer is no, the process is completed. However, if the answer from step 891 is yes, processing proceeds to step 893 in which the system takes the first remaining document from the original pile and labels it the current document and then proceeds to step 895. In step 895, the system compares the similarity of the current document to each existing subpile and then in step 897, the system sorts the matching subpiles by similarity to the current document. In step 899, the system adds the current document to the best matching subpile and proceeds back to step 891. The forgoing description of the process of subpiling from an original pile has been described with reference to a specific procedure; however, using known information retrieval technology, other implementations will be available to those in the art upon reference to this description and the information retrieval art.

An alternative to the process of creating a subpile according to either of the methods shown in FIG. 18*a* or 18*b* will be described. Prior to starting the subpiling process, the user may want to specify certain subpiles which must be created; this may be done by specifying a "seed" document which is representative of a desired subpile or a "virtual" seed document (specified by keywords which may be used to create an internal/content representation of the subpile). These desired subpiles are then used by the system as subpiles which exist immediately upon beginning the process (e.g. entering step 853) of creating subpiles from a pile. It should also be noted that the process of creating subpiles may be performed from several original piles merely by combining them into one original pile or by using one pile as an original pile and the other original piles as pre-existing subpiles.

Figure 19:
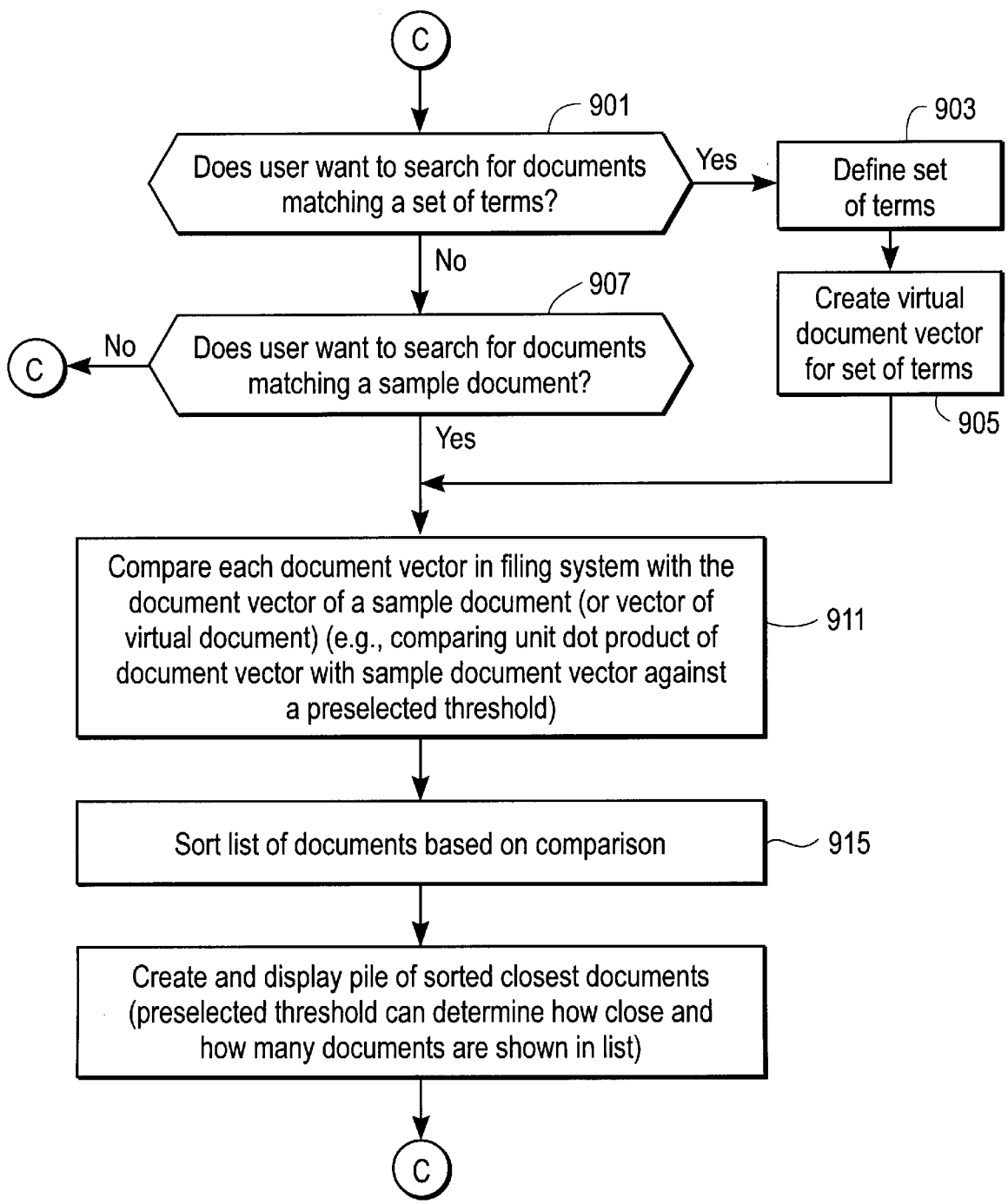
FIG. 19 shows a flowchart for searching of documents in the file system of the present invention.

The system and method of the present invention also provide a mechanism for searching documents in the file system of the computer whether those documents are in piles or conventional subdirectories/folders. This method is shown in FIG. 19 and begins at step 901, in which the system determines whether the user wants to search for documents matching a set of terms which are specified by the user. Typically, the user will indicate that a search is desired and the system will respond with a question asking the user whether the user wishes to define a set of terms or to specify a sample document. It will be appreciated that, other possible means of requesting a search or formulating a search may be used. If the user wants to specify a set of terms, the system allows in step 903 the user to do so and then creates in the step 905 a virtual document vector (or other representation of the terms) for the set of terms (and their user selected weights, unless by default the terms are equally weighted). That is, the user specifies terms and then those terms are used to specify a vector of a virtual document which Is used later when processing. Processing from step 905 proceeds directly to step 911. If the user wishes to search using a sample document (e.g. create a pile from a sample document manually by searching and obtaining a list of the documents or automatically create a pile containing the search results) then processing proceeds from step 901 to step 907 in which the system requests the user to specify the sample document; if no sample document is specified processing loops back to node C waiting for an interrupt or other instruction indicating to begin the search process. After the sample document is specified in step 907, the system proceeds to step 911 in which it compares each document's vector (or other representation of the document) in the system with the document vector (or other representation) of the sample document or the document vector (or other representation) of the virtual document created in step 905. This may occur by any of a number of ways of determining a similarity measure, including by determining the unit dot product of the sample document's vector against the vector of all documents in the system. It will be appreciated that alternative similarity measures or search routines may be employed, such as measuring the similarity between the document and each pile or folder and then searching within those piles or folders having the best matches to the document. It is noted that this comparison can eliminate documents which are not close enough by testing each dot product against a preselected threshold.

In step 915 the system sorts the list of documents based on the comparison with the document vector of the sample (or virtual) document. This list may be limited by the comparison against a preselected threshold as described above. Then in step 917 the system creates and displays a pile of the sorted documents which are closest to the sample (or virtual) document. Following step 917 processing proceeds back node C which waits for a command to search from the user. Alternatively, the pile may be divided into subpiles according to the techniques of the invention. The user may also, after the search pile is created, manipulate that pile to perform other searches such as a new or revised search.

Figure 20:
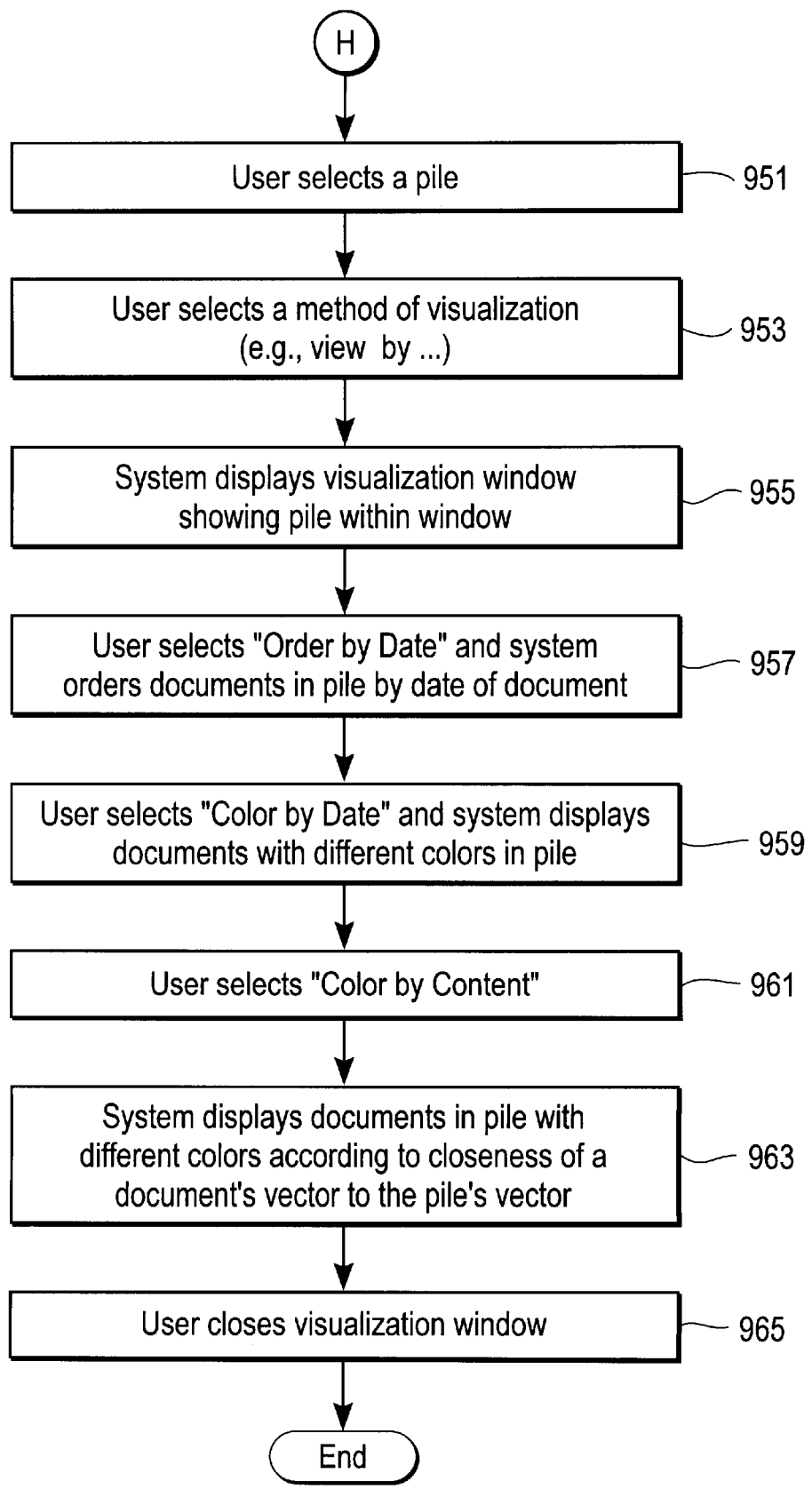
FIG. 20 is a flowchart showing a method for visualizing a pile by color.

FIG. 20 shows a method for using color to assist in organizing information in a computer and to assist a user in understanding the content and organization of piles within the following system. This method begins in step 951 wherein the user selects a pile and then in step 953 selects a method of visualization such as the visualization window 551 shown in FIG. 13*a*. This causes the system, in step 955, and display the visualization window showing the pile within the window (or the user may have to move the pile into the window). Then in step 957, the user selects the command "order by date" and the system orders documents in the pile by the date of the document. It is appreciated that step 957 is a two-part process even though it is shown as one. This may be done in any of the well known ways of sorting and listing documents by the date of the document. This date may be either the date maintained by the filing system of the document or may be a date line (field) of the document which is contained in the contents of the document and was provided by the author of the document. After step 957, the user in step 959 selects the command "color by date" and the system displays documents with different colors and organized according to the date. It is appreciated that step 959 is a two-part process even though it is shown as one. That is, the color of the document is correlated with the age of the document in the manner described above. This is done typically by determining the range of dates for the entire pile by determining the oldest document and the most recent document (and thereby determining the range) and thereby determining the range of the variable saturation for a particular color (e.g. 256 different saturation values for a given luminance and hue of a color). The oldest document would then be assigned the most saturated color (e.g. saturation level equal to 255 in an 8 bit color system) and the most recent document would have the least saturation (e.g. saturation level equal to zero for the same luminance and hue of a color). A document with a date in the middle of the date range would have half of the saturation of the oldest document and other documents would be proportioned accordingly. Other well known techniques may be used for assigning colors on the basis of the dates of the various documents in the pile. The user may next select "color by content" in step 961 in the manner described above in conjunction with FIG. 13*a*. This causes the system in step 963 to display the documents in the pile with different saturations of color according to the closeness (determined by a similarity measure) of the document to the internal representation of the pile. This may be done by comparing the document's vector to the pile's vector by the using the unit dot product of the two vectors in the manner described above. The computer would determine all dot products for all documents in the pile and then sort those dot products from highest to smallest. The highest dot product indicates a document which most closely matches the pile's internal representation (e.g. pile's vector) and the smallest dot product would indicate a document which is farthest away from the pile's internal representation. This sorted list of dot products corresponds to a sorted list of documents since each dot product is associated with a particular document and thus different saturations of a given color at the same luminance and hue may be supplied to the different documents according to their dot product. In other words, the dot product for a particular document maps to a particular saturation of a color the same way that the date maps to a color as described above. The user may desire that this pile retain its colored form based on coloring by content by selecting the okay button 571 and then by closing the visualization tool window. This will cause the new colored pile to appear on the display means 22 in the filing system of the present invention. It is noted that the order of many of the steps shown in FIG. 20 is not critical to the invention and these steps may be practiced in other sequences which are not shown.

Figure 21:
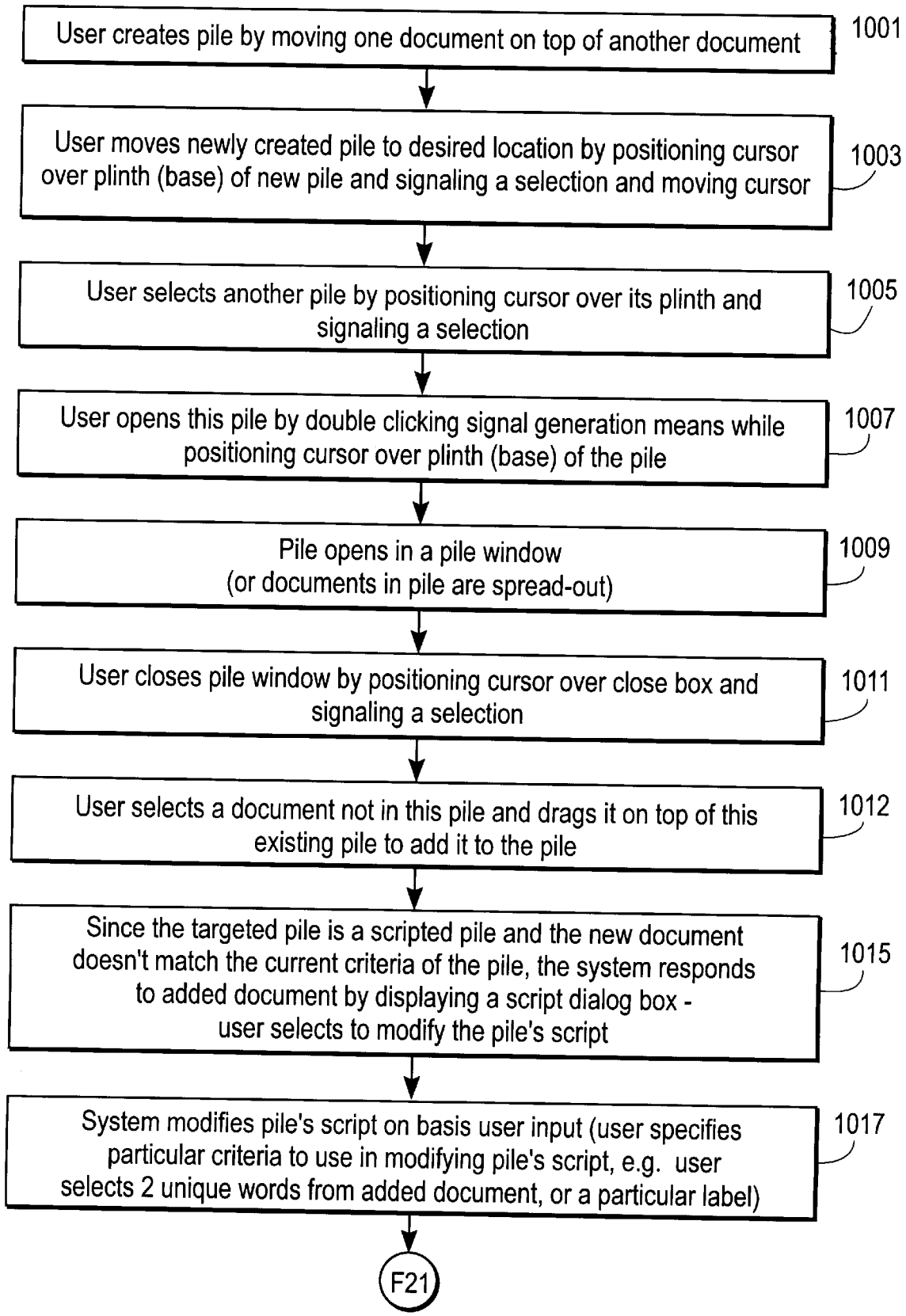
FIG. 21, in flowchart form, shows a typical example of a user performing operations on or with piles.
Figure 21:
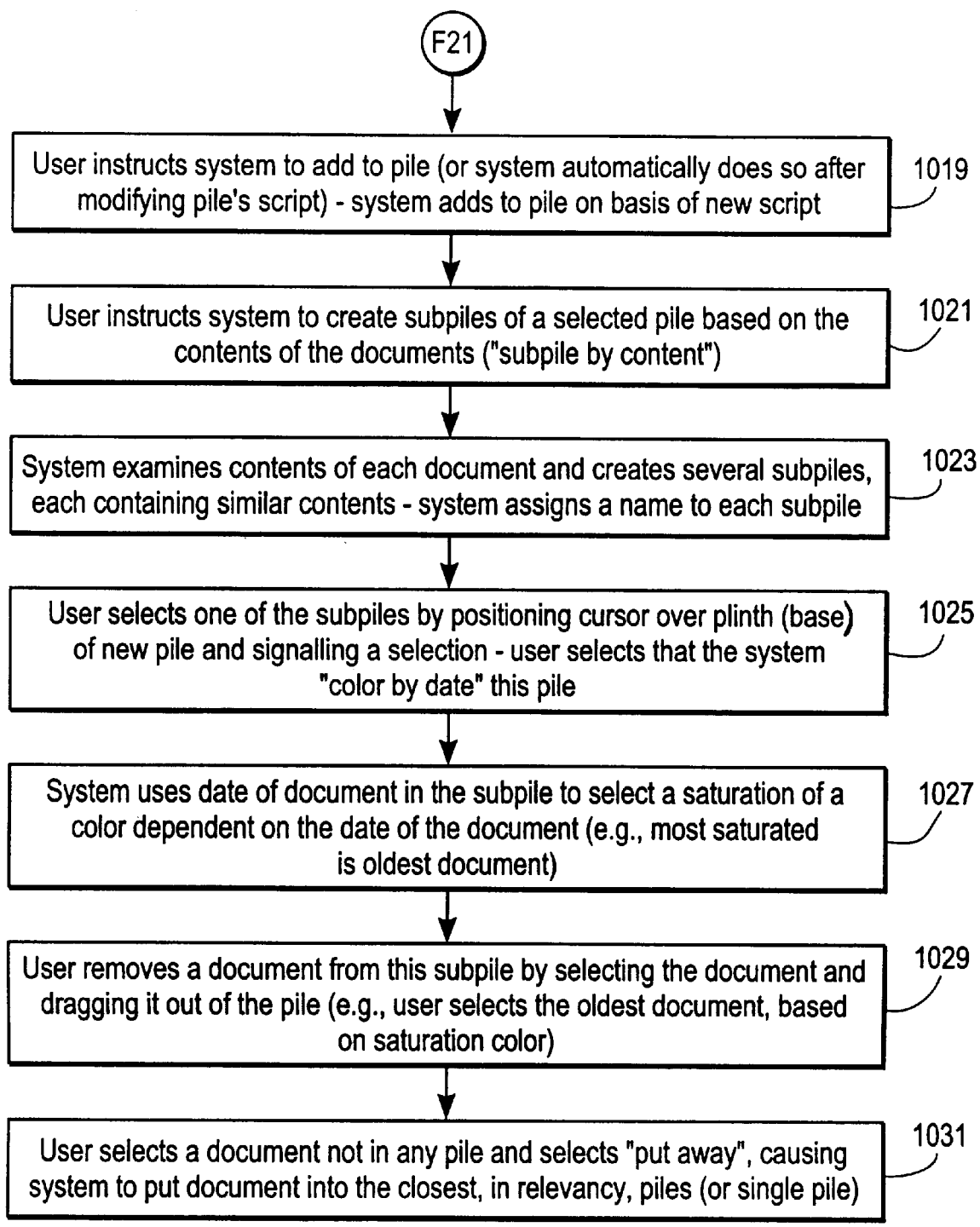

In order to summarize many of the features of the present, a typical example will be given of how a user may interact with piles. FIG. 21 represents a flow chart showing this typical example; the order of many of these steps is not critical to the invention and they may be practiced in other sequences which are not shown. Beginning in step 1001, the user creates a pile by moving one document on top of another. This has been described above in connection with FIG. 3 and other figures. The user may also create a pile by selecting two different documents and selecting a command available in the computer system to create a pile. Next the user in step 1003 moves the newly created pile by positioning the cursor over the base of the pile and signaling the selection of the pile and then moving the cursor to move the pile. In step 1005 the user selects another pile by positioning the cursor over the base of the pile and signalling a selection of that pile. In step 1007, the user opens the pile by any one of the mechanisms for obtaining an alternate view as described above. For example, by rapidly depressing and releasing (double clicking) the mouse button while positioning the cursor over the base of the pile. The system responds in step 1009 to the actions of the user in step 1007 by opening a pile window with the contents of the pile displayed in that window or alternatively by spreading out the documents in the form shown in FIG. 8*d*. An example of a pile window containing the contents of the pile is shown FIG. 8*a*.

In step 1011, the user may close the pile window by positioning the cursor over the close box and signalling a selection or by using any one of the other known techniques for closing a window in a graphical user interface. Then in step 1012, the user selects a document which is not in a pile and drags it to the top of an existing pile to add it to the pile. This is typically done in one of many ways for moving a document in a filing system having a graphical user interface, such as positioning the cursor over the icon of the document and selecting the document and keeping the document selected while the cursor is moved thereby moving the cursor and the document on the display screen. The system's response to step 1012 is step 1015 in which the system displays a script dialog box since the targeted pile to which the document was added is a scripted pile and since the new document has an internal representation which does not match the current criteria of the pile. The user selects in step 1015 to modify the pile's script. This takes place in step 1017 in which the system modifies the pile's script on the basis of the user's input. For example, the user specifies particular criteria to use in modifying the pile's script such as selecting two unique words from the added document or by using a particular label such as the label 614 shown in FIG. 14.

Then in step 1019, the user instructs the system to add documents to the pile on the basis of the pile's modified script or the system does so automatically after modifying the pile's script. Whether automatic or upon user instruction, the system adds to the pile on the basis of the new script in step 1019. The computer may display an animation of document icons moving from their old locations on the display screen into the pile.

In step 1021, the user instructs the system to create subpiles of a selected pile based on the contents of the documents. That is, the system is instructed to create subpiles on the basis of the contents (rather than for example the dates of the documents or other criteria upon which subpiling may be based). The system responds in step 1023 by examining the contents of each document in the selected pile and creating several subpiles from the original selected pile, each subpile containing similar content because of the operation of the present invention. The system as shown in step 1023 then assigns a name to each subpile on the basis of the words having the strongest weights for each subpile.

The user may then select, in step 1025, one of the subpiles by positioning the cursor over the base of the new pile and signalling a selection. The user then instructs the system to color the pile by date by selecting the command "color by date." This causes the system to respond in step 1027 by using the date of documents in the subpile to select a saturation of a color which is dependent on the date of the document. For example, the most saturated color represents the oldest document. The user in step 1029 then removes a document from this subpile by selecting the document and dragging it out of the pile. For example, the user may select the oldest document, based on the saturation color and remove it from the pile and examine the document. In step 1031, the user selects a document which is not in any pile and selects the command "put away" which causes the system to put the document into the closest, in relevancy, pile or piles depending upon user preference.

Figure 22A:
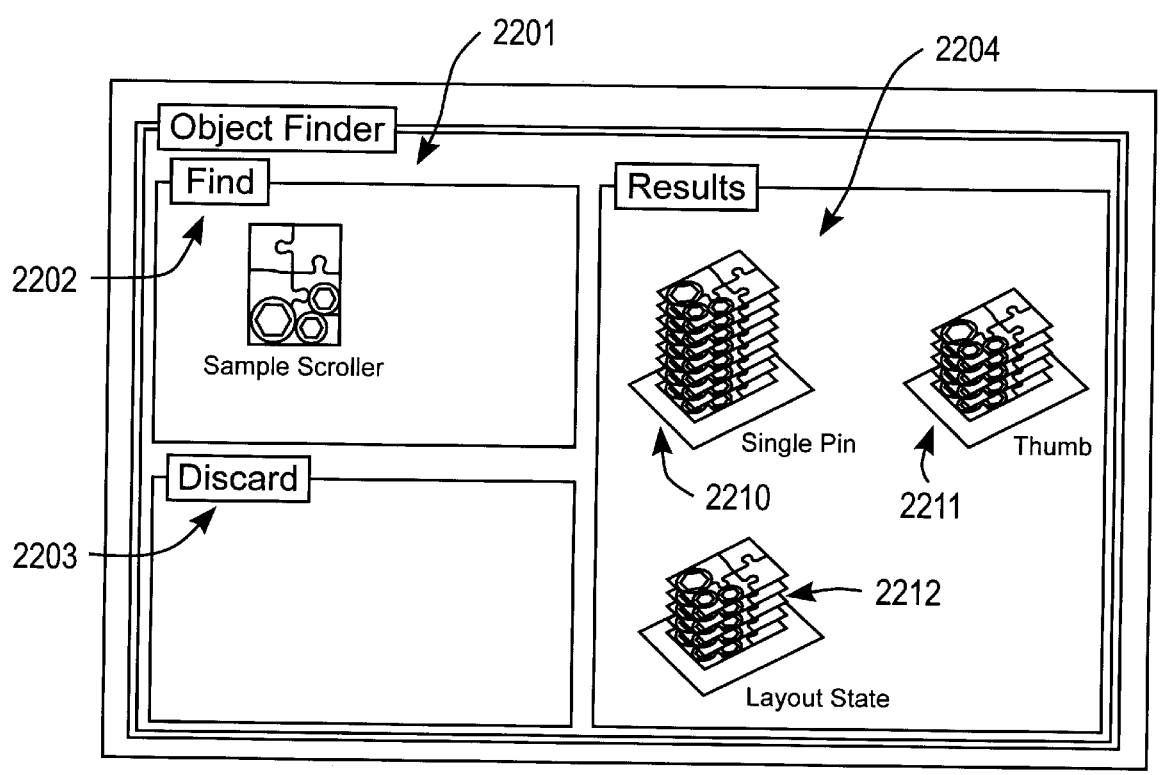
FIGS. 22a, 22b, 22c, 22d, and 22e show other examples of a user performing operations with piles; various screens of a computer system operating according to the invention are shown.

Another example of a user's interaction with piles according to the present invention will now be described by referring to FIGS. 22a, 22b, 22c, 22d and 22e. As shown in these figures, the method and apparatus of the present invention may be applied to an object oriented programming environment where the use of piles is made for programming documents which are not the typical text/based office document, even though programming files contain text. As shown in FIG. 22a, an object finder window 2201 includes three components which are the find box 2202, the results box 2204 and the discard box 2203. In this example, a search is specified by placing a sample document or a pile in the find box 2202 and the system will find objects that are similar to the objects in the find box 2202 provided they are not present in the discard box 2203. That is, the discard box 2203 acts as a "not" boolean logic search parameter. The results window or box 2204 shows the results of a search which have been automatically placed in three subpiles according to the present invention where the original search results were placed in a pile which was then divided into three subpiles 2210, 2211, and 2212.

Figure 22B:
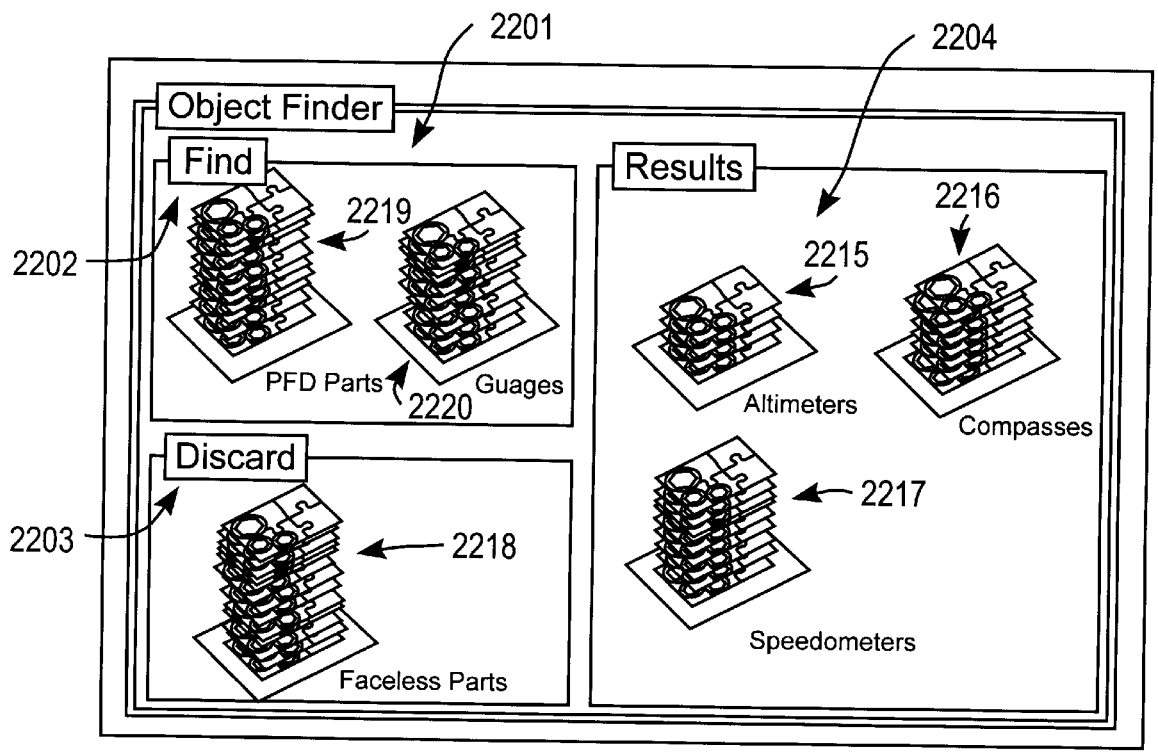

FIG. 22b shows a method and apparatus of the present invention where piles may be used to specify the search query rather than words or other query techniques. In this case, the find box 2202 contains the piles 2219 and 2220 which specify the search query (e.g. by using either internal representation of either pile as the search query). That is, the internal representation of pile 2219 is OR'ed together with the internal representation of the pile 2220 so that objects which are similar to either internal representation of either pile will show up in the results window 2204. As shown in FIG. 22b, the discard box 2203 contains the pile 2218 which is used to discard objects which are found in the search which match the internal representation of the pile 2218. It is important to realize that the descriptions for the search query are "fuzzy" in that they are specified by the pile's internal representation rather than a specific list of key words which are connected by boolean logical operators. The results of the search are shown in the box 2204.

Figure 22C:
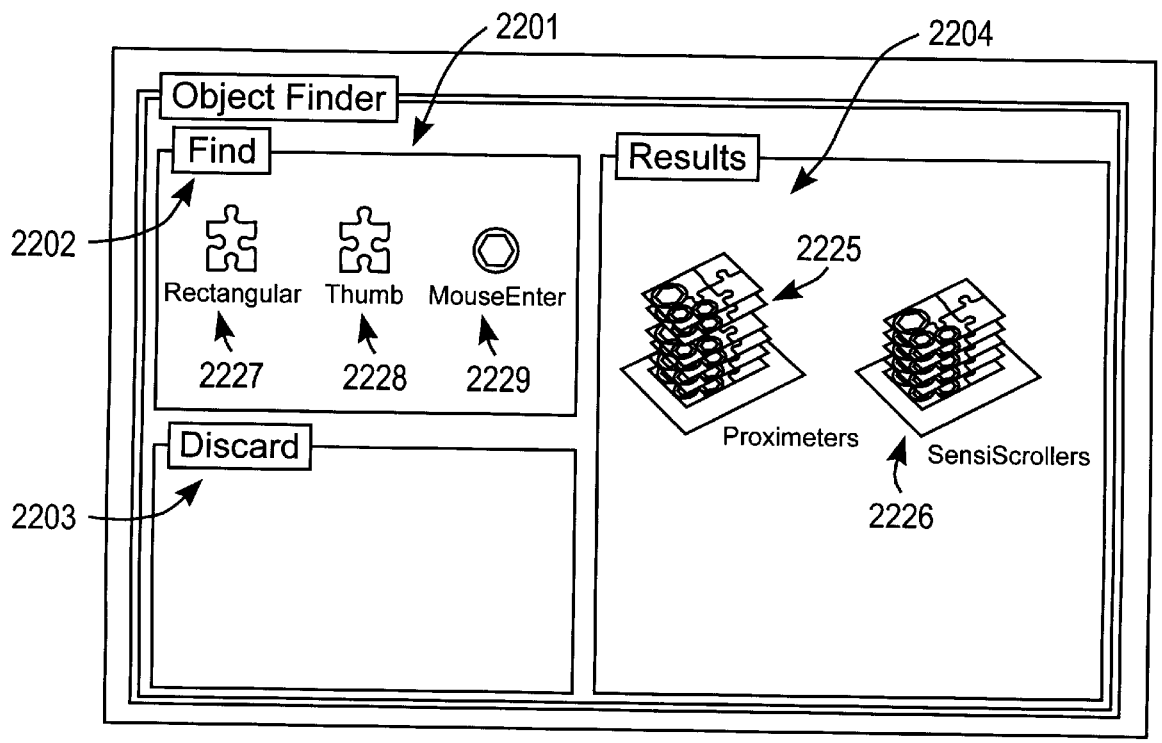

FIG. 22c shows another use of the object finder 2201 where attributes of objects 2227, 2228, and 2229 are used to search the computer's filing system for documents and other objects which match the search criteria or have those attributes. These objects may be piles or other objects which may be treated as a text document and from which an internal representation of the document may be derived.

Figure 22D:
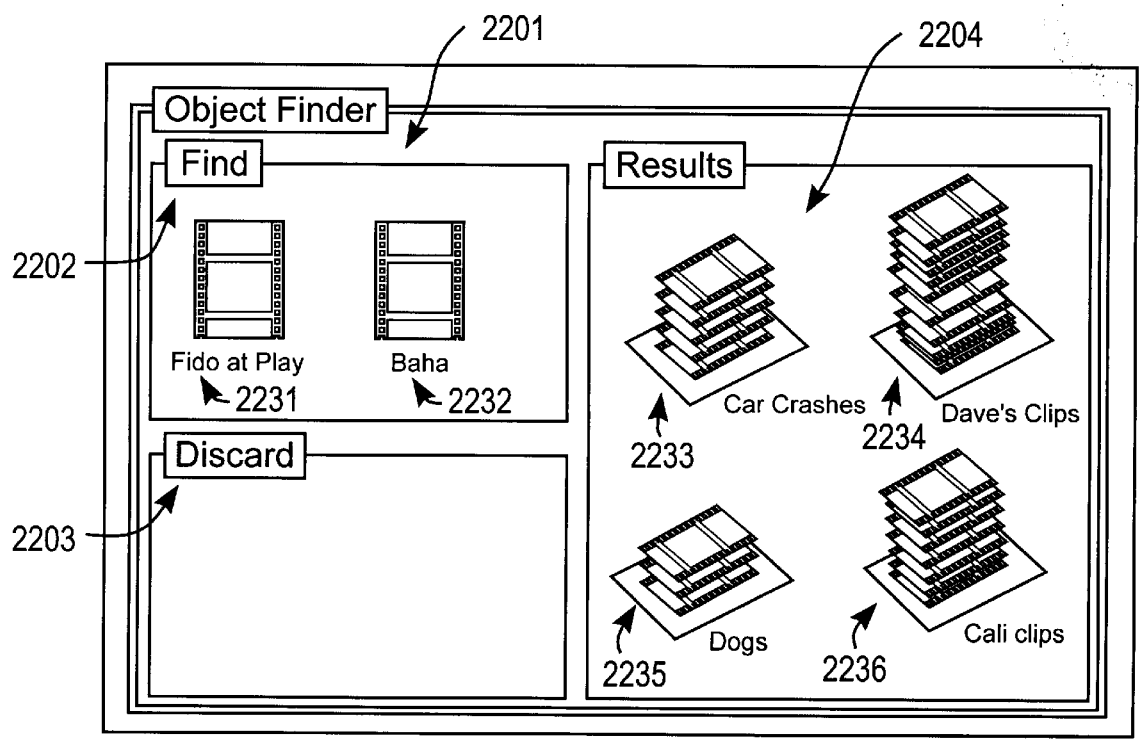
Figure 22E:
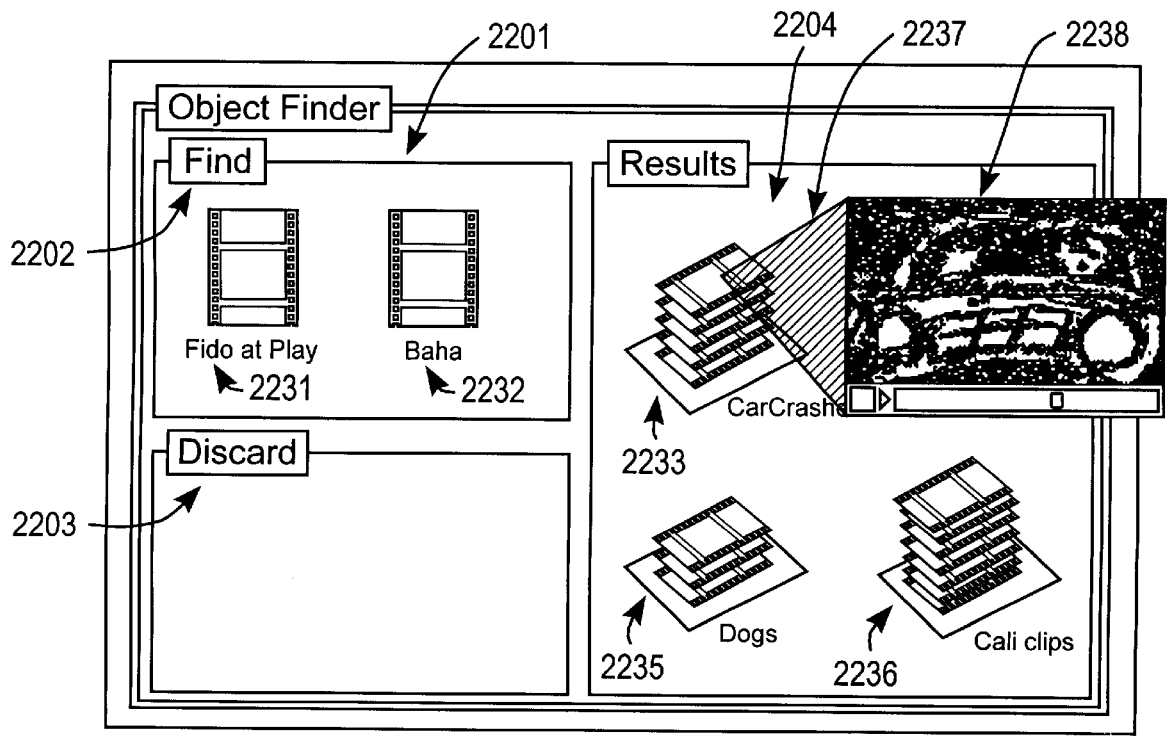

FIGS. 22d and 22e show a use of the invention in connection with media objects which represent digitized movies. Each digitized movie ("clip") have all been indexed by key words when they were created or when they were edited. The user has placed two clips (digitized movies) into the find box 2202 in order to find similar clips on the basis of the text/keywords for each clip. The user instructs the computer to find such clips on the basis of either clip 2231 or clip 2232 within the find box 2202. The system responds displaying four piles 2233, 2234, 2235 and 2236 which match the internal description (or exceed a threshold set for comparison purposes against a similarity measure). In this case, the four piles shown in the results window 2204 of FIG. 22d were created by subpiling the original search results pile created from the find operation. The user may the browse one of the piles as shown in FIG. 22e to look for certain items which are desired. As shown in FIG. 22e, the user has browsed the pile 2233 to find a particular digitized movie, the indicia or proxy 2238 of which is shown in the view cone 2237 as shown in FIG. 22e. It will be appreciated that the proxy in the case of a movie may actually be an animated dicon of the digitized movie in that various frames of the movie may be displayed rapidly in sequence in order to convey the impression the movie normally conveys when it is played. Similar techniques may be employed for other multimedia objects, such as digitized sound, etc.

The foregoing method and apparatus of the present invention may be conveniently implemented in a computer program in a computer system that is based upon the flow charts described above. No particular programming language has been indicated for carrying out the various procedures described because it is considered that the operations, steps and procedures described above and illustrated in the accompanying drawings are sufficiently disclosed to permit one of ordinary skill in the art to practice the invention. Moreover, there are many computers and operating systems which may be used in practicing the invention and therefore no detailed computer program could be provided which would applicable to these many different systems. Each user of a particular computer will be aware of the languages and tools which are most useful for that users needs and purposes.

While the invention has been specifically described with reference to the figures and with emphasis on certain computer systems, it should be understood that the figures are for illustration only and should not be taken as limitations upon the invention. It is contemplated that many changes and modifications may be made by one of ordinary skill in the art to the apparatus the departing from the spirit and scope of the invention as claimed below.

We claim:

1. A method for organizing information in a computer filing system having a display device and a first plurality of documents, said method comprising:

displaying at some time on said display device a graphical representation of a first document and a graphical representation of a second document from said first plurality of documents;

creating a collection of documents comprising a second plurality of documents having said first document and said second document;

determining for said collection at least one of (a) an internal collective representation or (b) a user defined specification, wherein said internal collective representation is based on internal representations of said first and said second documents;

displaying a graphical representation of said collection of documents on said display device; and viewing at least one of the documents in said collection by displaying an indicia of said at least one document by selecting, from said graphical representation of said collection, said at least one document wherein said viewing comprises pointing a cursor on said display device at a graphical representation of one of said documents in said collection for a predetermined period of time to reveal an indicia of said document in said collection and wherein said indicia has multiple pages for a multiple page document and wherein the user views the multiple pages of said indicia by signaling to the computer to move from page to page of said indicia.

2. A method for organizing information in a computer filing system having a display device and a first plurality of documents, said method comprising:

displaying at some time on said display device a graphical representation of a first document;

said computer system creating a collection of documents comprising at least a second document and said first document, wherein said step of creating a collection comprises indicating to said computer system that a collection of documents is to be created using said first document as a sample document for said collection of document and wherein said computer system searches said first plurality of documents based on said first document to find said second document; and displaying a graphical representation of said collection on said display device.

3. A method as in claim 2 further comprising viewing at least one of the documents in said collection by displaying an indicia of said at least one document by selecting, from said graphical representation of said collection, said at least one document.

4. A method as in claim 2 further comprising creating a representation of said collection of documents based on an internal representation of said first document.

5. A method for organizing information in computer system having a display device, said method comprising:

displaying at some time on said display device a representation of a first document and a representation of a second document;

creating a collection of documents comprising said first and said second documents;

determining for said collection of documents at least one of (a) an internal collective representation or (b) a first user defined specification, wherein said internal collective representation is based on internal representations of said first and second documents;

displaying a graphical representation of said collection of documents; and determining for a further internal representative of said collection when a third document is added to said collection based on one of: (a) an internal representation of each of the documents in said collection, or (b) said first or a second user defined specification wherein said computer system has a filing system having a graphical user interface and said method is performed in part by said filing system and wherein said representations of said first document and said second document are graphical representations and wherein said further internal representation of said collection is one of said first and second user defined specifications defining a selected user defined specification and wherein the user indicates to said computer system to add a fourth item to said collection, which fourth item has an internal representation which does not match said selected user defined specification, and wherein, after the user has indicated to add said fourth item to said collection, said computer system prompts the user to determine whether the fourth item is to be added to said collection without modifying said selected user defined specification or the fourth item is to be added and said selected user defined specification is to be modified.

6. A method for organizing and viewing information in a computer filing system having a display device and a first plurality of documents, said method comprising:

displaying a graphical iconic representation of a collection of said first plurality of documents;

displaying a first indicia of a first document of said collection by selecting a first position from said graphical iconic representation, said first indicia of said first document being selected for display regardless of said first position on said graphical iconic representation, wherein said selecting from said graphical iconic representation comprises positioning a cursor on said graphical iconic representation, and further comprising:

displaying in series a second indicia of a second document and a third indicia of a third document by positioning said cursor first on a second position on said graphical iconic representation next on a third position on said graphical iconic representation.

7. A method as in claim 6 wherein said during said step of displaying in series said second indicia and said third indicia, said graphical iconic representation is concurrently displayed.

8. A method as in claim 7 wherein said second indicia is displayed adjacent to said graphical iconic representation and said third indicia is displayed adjacent to said graphical iconic representation.

* * * * *